(12) United States Patent
Ma et al.

(10) Patent No.: US 11,128,874 B2
(45) Date of Patent: Sep. 21, 2021

(54) MOTION COMPENSATING PREDICTION METHOD AND DEVICE

(71) Applicants: Huawei Technologies Co., Ltd., Shenzhen (CN); University of Science and Technology of China, Hefei (CN)

(72) Inventors: Xiang Ma, Shenzhen (CN); Haitao Yang, Shenzhen (CN); Li Li, Hefei (CN); Houqiang Li, Hefei (CN)

(73) Assignees: Huawei Technologies Co., Ltd., Shenzhen (CN); University of Science and Technology of China, Hefei (CN)

( * ) Notice: Subject to any disclaimer, the term of this patent is extended or adjusted under 35 U.S.C. 154(b) by 58 days.

(21) Appl. No.: 16/289,250

(22) Filed: Feb. 28, 2019

(65) Prior Publication Data

US 2019/0268608 A1 Aug. 29, 2019

Related U.S. Application Data

(63) Continuation of application No. PCT/CN2017/098894, filed on Aug. 24, 2017.

(30) Foreign Application Priority Data

Aug. 30, 2016 (CN) .................... 201610783101.X
Oct. 13, 2016 (CN) .................... 201610896027.2

(51) Int. Cl.
*H04N 19/167* (2014.01)
*H04N 19/105* (2014.01)
(Continued)

(52) U.S. Cl.
CPC ......... *H04N 19/167* (2014.11); *H04N 19/105* (2014.11); *H04N 19/176* (2014.11);
(Continued)

(58) Field of Classification Search
CPC .. H04N 19/167; H04N 19/105; H04N 19/176; H04N 19/182; H04N 19/51; H04N 19/513; H04N 19/59
See application file for complete search history.

(56) References Cited

U.S. PATENT DOCUMENTS

2006/0034523 A1 2/2006 Park
2018/0124426 A1 5/2018 Jeon et al.
(Continued)

FOREIGN PATENT DOCUMENTS

CN 101002474 A 7/2007
CN 105137705 A 12/2015
(Continued)

OTHER PUBLICATIONS

Li Li et al., "Projection Based Advanced Motion Model for Cubic Mapping for 360-Degree Video," arXiv:1702.06277v1 [cs.MM], pp. 1-5, XP080747925 (Feb. 21, 2017).
(Continued)

*Primary Examiner* — Hesham K Abouzahra
(74) *Attorney, Agent, or Firm* — Leydig, Voit & Mayer, Ltd.

(57) ABSTRACT

Embodiments of the present invention provide a motion compensating prediction method and a motion compensating prediction apparatus. The motion compensating prediction method includes: determining a location of an initial reference pixel of a current pixel in a reference image, where the current pixel is located in a first sub-image of a current image; when the initial reference pixel is located outside a second sub-image that is in the reference image and that is at a location corresponding to the first sub-image, determining a location of a target reference pixel of the current pixel in the reference image based on the location of the initial reference pixel; and determining a predicted value of a pixel value of the current pixel based on a pixel value of the target
(Continued)

reference pixel and/or a pixel value of a pixel near the target reference pixel.

22 Claims, 20 Drawing Sheets

(51) Int. Cl.
    *H04N 19/176* (2014.01)
    *H04N 19/513* (2014.01)
    *H04N 19/59* (2014.01)
    *H04N 19/182* (2014.01)
    *H04N 19/51* (2014.01)

(52) U.S. Cl.
    CPC .......... *H04N 19/182* (2014.11); *H04N 19/51* (2014.11); *H04N 19/513* (2014.11); *H04N 19/59* (2014.11)

(56) References Cited

U.S. PATENT DOCUMENTS

| | | | |
|---|---|---|---|
| 2018/0359487 A1 | 12/2018 | Bang et al. | |
| 2019/0158827 A1* | 5/2019 | Sim | H04N 19/176 |
| 2019/0215532 A1* | 7/2019 | He | H04N 13/117 |

FOREIGN PATENT DOCUMENTS

| | | |
|---|---|---|
| CN | 105245838 A | 1/2016 |
| CN | 105898344 A | 8/2016 |
| JP | 2005159824 A | 6/2005 |
| JP | 2013046270 A | 3/2013 |
| JP | 2019502298 A | 1/2019 |
| KR | 20130133250 A | 12/2013 |
| KR | 20150090010 A | 8/2015 |

OTHER PUBLICATIONS

Eichenseer et al., "A Hybrid Motion Estimation Technique for Fisheye Video Sequences Based on Equisolid Re-Projection," ICIP 2015, Multimedia Communications and Signal Processing, pp. 3565-3569. XP032827090, Institute of Electrical and Electronics Engineers—New York, New York (2015).

Ma et al., "Co-projection-plane based motion compensated prediction for cubic format VR content," Joint Video Exploration Team (JVET) of ITU-T SG 16 WP 3 and ISO/IEC JTC 1/SC 29/WG 11, 4th Meeting: Chengdu, CN, JVET-D0061, pp. 1-4, International Telecommunication Union, Geneva, Switzerland (Oct. 15-21, 2016).

Chen et al., "Expanding Line Search for Panorama Motion Estimation," 2009 11th IEEE International Symposium on Multimedia, San Diego, California, pp. 577-582, Institute of Electrical and Electronics Engineers, New York, New York (Dec. 14-16, 2009).

* cited by examiner

```
┌─────────────────────────────────────────────────────────────┐
│   Determine a location of an initial reference pixel of a current pixel in a      │  110
│   reference image, where the current pixel is located in a first sub-image of a   │
│                          current image                                             │
└─────────────────────────────────────────────────────────────┘
                                    │
┌─────────────────────────────────────────────────────────────┐
│ When the initial reference pixel is located outside a second sub-image that is in │
│    the reference image and that is at a location corresponding to the first sub-  │
│   image, determine a location of a target reference pixel of the current pixel in │
│   the reference image based on the location of the initial reference pixel, where a│
│   connecting line between a location of the target reference pixel on a surface of│  120
│   a polyhedron corresponding to the reference image and a location of the initial │
│  reference pixel on a first plane passes through a center point of the polyhedron,│
│     the location of the target reference pixel on the surface of the polyhedron is│
│     determined based on the location of the initial reference pixel and layout    │
│    information of the polyhedron corresponding to the reference image, and the    │
│   first plane is a plane on which a face, of the polyhedron, corresponding to the │
│                       second sub-image is located                                  │
└─────────────────────────────────────────────────────────────┘
                                    │
┌─────────────────────────────────────────────────────────────┐
│   Determine a predicted value of a pixel value of the current pixel based on a    │  130
│   pixel value of the target reference pixel and/or a pixel value of a pixel near the│
│                          target reference pixel                                    │
└─────────────────────────────────────────────────────────────┘
```

FIG. 5

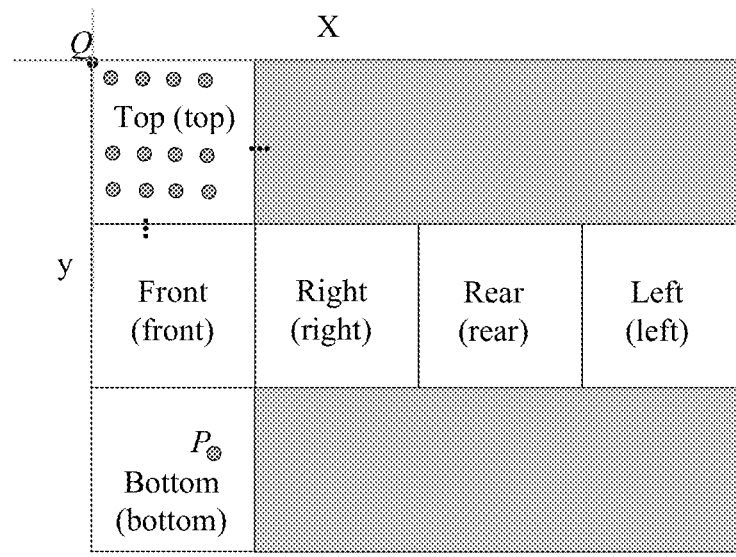
(a)
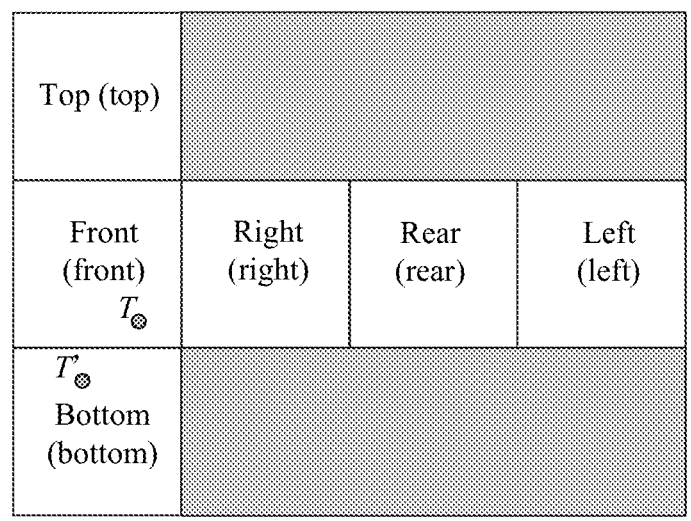
(b)
FIG. 6

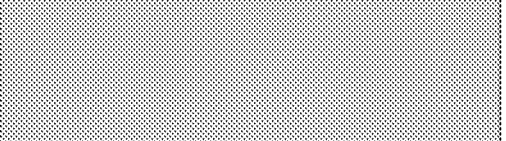
(a)
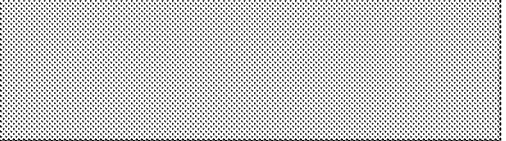
(b)
FIG. 8

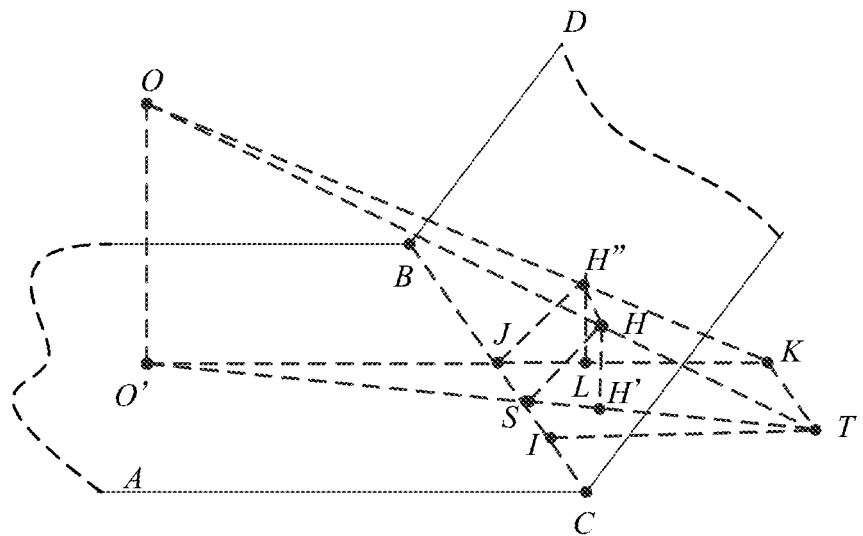
(a)
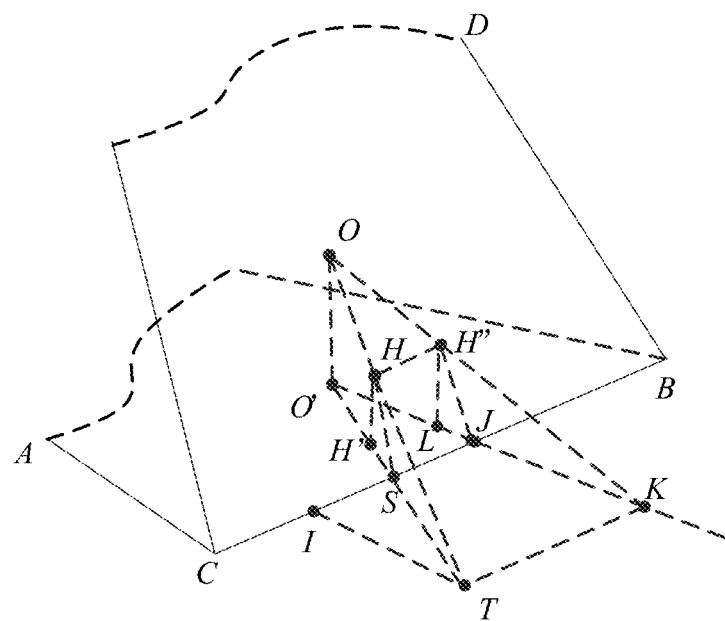
(b)
FIG. 11

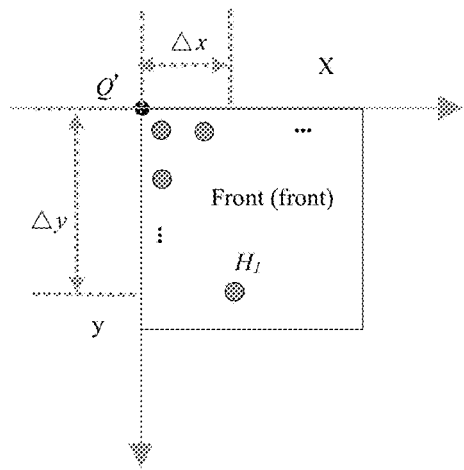
(a)
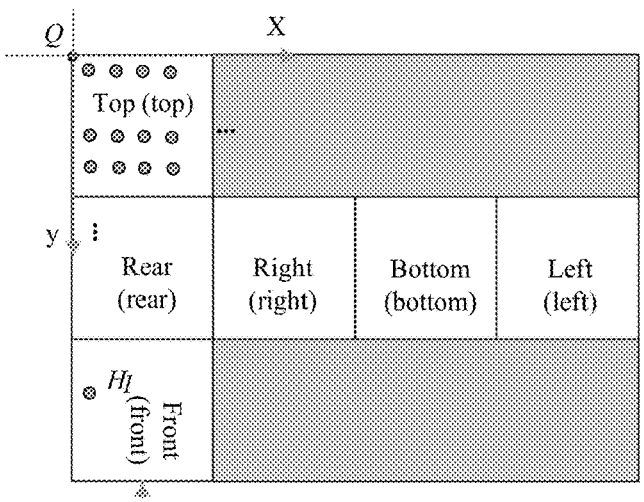
(b)
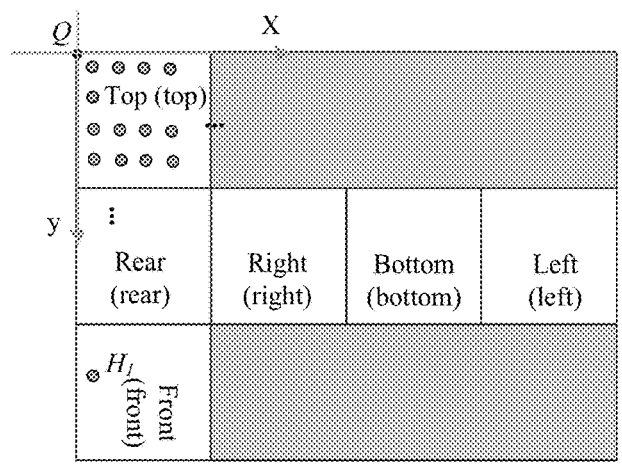
(c)
FIG. 12

| Top (top) | | | |
|---|---|---|---|
| Front (front) | Right (right) | Rear (rear) | Left (left) |
| $P_0$ Bottom (bottom) | | | |

FIG. 15A

| Top (top) | | | |
|---|---|---|---|
| Front (front) $T_0$ | Right (right) | Rear (rear) | Left (left) |
| $T'_0$ Bottom (bottom) | | | |

FIG. 15B

MOTION COMPENSATING PREDICTION METHOD AND DEVICE

CROSS-REFERENCE TO RELATED APPLICATIONS

This application is a continuation of International Application No. PCT/CN2017/098894, filed on Aug. 24, 2017, which claims priority to Chinese Patent Application No. 201610783101.X, filed on Aug. 30, 2016 and Chinese Patent Application No. 201610896027.2, filed on Oct. 13, 2016. The disclosures of the aforementioned applications are hereby incorporated by reference in their entireties.

TECHNICAL FIELD

Embodiments of the present invention relate to the image processing field, and more specifically, to a motion compensating prediction method and device.

BACKGROUND

During processing performed on a spherical panorama image (hereinafter referred to as a spherical image), usually, the spherical image is first projected to obtain a polyhedron-format two-dimensional planar panorama image (hereinafter referred to as a two-dimensional image), and then, encoding and decoding operations are performed on the polyhedron-format two-dimensional image.

When motion compensating prediction is performed on the polyhedron-format two-dimensional image, usually, a location of a reference pixel of a current pixel is first determined, and then, a pixel value of the current pixel is predicted based on a pixel value of the reference pixel. In a motion compensating prediction process in the prior art, regardless of whether the reference pixel is located on a face on which the current pixel is located, the pixel value of the current pixel is predicted based on the pixel value at the location of the reference pixel. When the reference pixel is not located on the face on which the current pixel is located, an effect of predicting the pixel value of the current pixel based on the pixel value at the location of the reference pixel is relatively poor, because faces in the polyhedron-format two-dimensional image are not located on a same projection plane and deformation exists in a join region of the faces.

SUMMARY

An embodiment of the present invention provides a motion compensating prediction method and a motion compensating prediction apparatus, to improve a motion compensating prediction effect.

According to a first aspect, a motion compensating prediction method is provided, where the method includes: determining a location of an initial reference pixel of a current pixel in a reference image, where the current pixel is located in a first sub-image of the current image; when the initial reference pixel is located outside a second sub-image that is in the reference image and that is at a location corresponding to the first sub-image, determining a location of a target reference pixel of the current pixel in the reference image based on the location of the initial reference pixel, where a connecting line between a location of the target reference pixel on a surface of a polyhedron corresponding to the reference image and a location of the initial reference pixel on a first plane passes through a center point of the polyhedron, the location of the target reference pixel on the surface of the polyhedron is determined based on the location of the initial reference pixel and layout information of the polyhedron corresponding to the reference image, and the first plane is a plane on which a face, of the polyhedron, corresponding to the second sub-image is located; and determining a predicted value of a pixel value of the current pixel based on a pixel value of the target reference pixel and/or a pixel value of a pixel near the target reference pixel.

When the initial reference pixel is located outside the second sub-image, prediction for the current pixel directly based on the initial reference pixel is inaccurate due to impact of geometrical deformation of a sub-image boundary of a two-dimensional image. Therefore, in this case, according to an embodiment of the present invention, the target reference pixel that can actually implement a reference function is found based on the location of the initial reference pixel, and then, the pixel value of the current pixel is predicted based on the target reference pixel. This improves accuracy of motion compensating prediction.

The second sub-image is a sub-image that is in the reference image and that is at the location corresponding to the first sub-image in the current image. For example, polyhedrons corresponding to the current image and the reference image are both regular hexahedrons, and formats of the current image and the reference image are both 4×3. It is assumed that the first sub-image of the current image is corresponding to a bottom face of a regular hexahedron corresponding to the current image. In this case, the second sub-image of the reference image is also corresponding to a bottom face of a regular hexahedron corresponding to the reference image.

The polyhedron corresponding to the reference image may be disposed on the reference image. In this case, an anchor face of the polyhedron is a face on which a region of the second sub-image in the reference image is located. The anchor face is a face used as a reference when the polyhedron is unfolded. For example, when the polyhedron is unfolded, a bottom face of the polyhedron is placed on a plane, and then, other faces of the polyhedron are unfolded onto the plane. In this case, a location of the bottom face on the plane remains unchanged, and the other faces of the polyhedron are unfolded onto another region of the plane. In this case, the bottom face is the anchor face of the polyhedron.

With reference to the first aspect, in a first implementation of the first aspect, the method further includes: determining, based on layout information of the reference image and the location of the initial reference pixel, whether the initial reference pixel is located outside the second sub-image in the reference image.

Whether the initial reference pixel is outside the second sub-image in the reference image is determined, so that when the initial reference pixel is not in the second sub-image, the pixel value of the current pixel can be predicted directly based on the initial reference pixel, with no need to determine the target reference pixel based on the initial reference pixel.

With reference to the first aspect or the first implementation of the first aspect, in a second implementation of the first aspect, the determining a location of a target reference pixel of the current pixel in the reference image based on the location of the initial reference pixel includes: determining the location of the target reference pixel on the surface of the polyhedron based on the location of the initial reference pixel and the layout information of the reference image, where the location of the target reference pixel on the surface of the polyhedron is at an intersection point of the surface of the polyhedron and a connecting line between the initial reference pixel and the center point of the polyhedron; and determining the location of the target reference pixel in the reference image based on the location of the target reference pixel on the surface of the polyhedron and the layout information of the reference image.

With reference to the second implementation of the first aspect, in a third implementation of the first aspect, the determining the location of the target reference pixel on the surface of the polyhedron based on the location of the initial reference pixel and the layout information of the reference image includes: determining the location of the initial reference pixel on the first plane based on the location of the initial reference pixel and the layout information of the reference image; and determining the location of the target reference pixel on the surface of the polyhedron based on the location of the initial reference pixel on the first plane and the layout information of the reference image.

With reference to any one of the first aspect, or the first to the third implementations of the first aspect, in a fourth implementation of the first aspect, the layout information includes at least one of face quantity information of the polyhedron, sub-image arrangement manner information of the reference image, sub-image arrangement sequence information of the reference image, and sub-image rotation information of the reference image.

With reference to any one of the first aspect, or the first to the fourth implementations of the first aspect, in a fifth implementation of the first aspect, the determining a predicted value of a pixel value of the current pixel based on a pixel value of the target reference pixel and/or a pixel value of a pixel near the target reference pixel includes: determining the pixel value of the target reference pixel as the predicted value of the pixel value of the current pixel.

With reference to any one of the first aspect, or the first to the fourth implementations of the first aspect, in a sixth implementation of the first aspect, the determining a predicted value of a pixel value of the current pixel based on a pixel value of the target reference pixel and/or a pixel value of a pixel near the target reference pixel includes: performing weighted processing on the pixel value of the target reference pixel and the pixel value of the pixel near the target reference pixel; and determining a pixel value that is obtained through the weighted processing and that is at the location of the target reference pixel, as the predicted value of the pixel value of the current pixel.

With reference to any one of the first aspect, or the first to the fourth implementations of the first aspect, in a seventh implementation of the first aspect, the determining a predicted value of a pixel value of the current pixel based on a pixel value of the target reference pixel and/or a pixel value of a pixel near the target reference pixel includes: performing an interpolation operation at the location of the target reference pixel based on the pixel value of the pixel near the target reference pixel; and determining a pixel value obtained through the interpolation operation, as the predicted value of the pixel value of the current pixel.

In some implementations, both the current image and the reference image are two-dimensional images.

In some implementations, the determining, based on layout information of the reference image and the location of the initial reference pixel, whether the initial reference pixel is located outside the second sub-image in the reference image includes: determining, based on the location of the initial reference pixel and a region in which the second sub-image of the reference image is located, whether the initial reference pixel is located outside the second sub-image in the reference image, where the region in which the second sub-image of the reference image is located is determined based on the layout information of the reference image.

In some implementations, a polyhedron corresponding to the two-dimensional image is a regular polyhedron. The regular polyhedron may include a regular tetrahedron, a regular hexahedron, a regular octahedron, a regular dodecahedron, and a regular icosahedron.

In some implementations, when the initial reference pixel is located in the second sub-image that is in the reference image and that is at the location corresponding to the first sub-image, the predicted value of the pixel value of the current pixel is determined based on a pixel value of the initial reference pixel.

When the initial reference pixel is located in the second sub-image, the target reference pixel does not need to be searched for based on the initial reference pixel; instead, the pixel value of the current pixel may be predicted directly based on the pixel value of the initial reference pixel. The target reference pixel needs to be searched for based on the location of the initial reference pixel only when the initial reference pixel is not located in the second sub-image (in this case, because deformation exists in an adjacent region of a sub-image in the two-dimensional image, the pixel value of the current pixel cannot be predicted directly based on the initial reference pixel).

According to a second aspect, a motion compensating prediction method is provided, where the method includes: determining a location of an initial reference pixel of a current pixel in a reference image, where the current pixel is located in a first sub-image of the current image; when the initial reference pixel is located outside a second sub-image that is in the reference image and that is at a location corresponding to the first sub-image, determining a location of a target reference pixel of the current pixel in an extension region of the second sub-image, where the extension region of the second sub-image is located outside the second sub-image, the extension region includes a plurality of pixels, a pixel value of any first pixel in the extension region is determined based on a pixel value of a second pixel in the reference image, a connecting line between a location of the second pixel on a surface of a polyhedron formed by the reference image and a location of the first pixel on a first plane passes through a center point of the polyhedron, the location of the second pixel on the surface of the polyhedron is determined based on the location of the first pixel and layout information of the polyhedron corresponding to the reference image, and the first plane is a plane on which a face, of the polyhedron, corresponding to the second sub-image is located; and determining a predicted value of a pixel value of the current pixel based on a pixel value of the target reference pixel and/or a pixel value of a pixel near the target reference pixel.

When the initial reference pixel is located outside the second sub-image, prediction for the current pixel directly based on the initial reference pixel is inaccurate due to impact of geometrical deformation of a sub-image boundary of a two-dimensional image. Therefore, in this case, according to an embodiment of the present invention, the target reference pixel that can actually implement a reference function is searched for directly in the extension region based on the current pixel and motion information of the current pixel, and then, the pixel value of the current pixel is predicted based on the target reference pixel. In this way, the target reference pixel can be quickly found, and further, accuracy of motion compensating prediction can be improved.

It should be understood that the extension region of the second sub-image may be predetermined according to the method in the first aspect.

With reference to the second aspect, in a first implementation of the second aspect, the method further includes: determining the location of the second pixel on the surface of the polyhedron based on the location of the first pixel and layout information of the reference image, where the location of the second pixel on the surface of the polyhedron is at an intersection point of the surface of the polyhedron and a connecting line between the first pixel and the center point of the polyhedron; and determining a location of the second pixel in the reference image based on the location of the second pixel on the surface of the polyhedron and the layout information of the reference image.

With reference to the second aspect or the first implementation of the second aspect, in a second implementation of the second aspect, the method further includes: determining, based on the layout information of the reference image and the location of the initial reference pixel, whether the initial reference pixel is located outside the second sub-image in the reference image.

According to a third aspect, a motion compensating prediction method is provided, where the method includes: determining a location of an initial reference pixel of a current pixel in a reference image, where the current pixel is located in a first sub-image of the current image; when the initial reference pixel is located outside a second sub-image that is in the reference image and that is at a location corresponding to the first sub-image, determining, based on the location of the initial reference pixel, a location of a target reference pixel of the current pixel on a surface of a polyhedron corresponding to the reference image, where a connecting line between the location of the target reference pixel on the surface of the polyhedron and a location of the initial reference pixel on a first plane passes through a center point of the polyhedron, and the first plane is a plane on which a face, of the polyhedron, corresponding to the second sub-image is located; determining a location of the target reference pixel in the reference image based on the location of the target reference pixel on the surface of the polyhedron; and determining a predicted value of a pixel value of the current pixel based on a pixel value of the target reference pixel in the reference image and/or a pixel value of a pixel near the target reference pixel.

When the initial reference pixel is located outside the second sub-image, prediction for the current pixel directly based on the initial reference pixel is inaccurate due to impact of geometrical deformation of a sub-image boundary of a two-dimensional image. Therefore, in this case, according to an embodiment of the present invention, the target reference pixel that can actually implement a reference function is found based on the location of the initial reference pixel, and then, the pixel value of the current pixel is predicted based on the target reference pixel. This improves accuracy of motion compensating prediction.

With reference to the third aspect, in a first implementation of the third aspect, the determining, based on the location of the initial reference pixel, a location of a target reference pixel of the current pixel on a surface of a polyhedron corresponding to the reference image includes: determining the location of the initial reference pixel on the first plane based on the location of the initial reference pixel and layout information of the reference image; and determining the location of the target reference pixel on the surface of the polyhedron based on the location of the initial reference pixel on the first plane and the layout information of the reference image.

With reference to the third aspect or the first implementation of the third aspect, in a second implementation of the third aspect, the determining a location of the target reference pixel in the reference image based on the location of the target reference pixel on the surface of the polyhedron includes: determining the location of the target reference pixel in the reference image based on the location of the initial reference pixel and the layout information of the reference image, where the location of the target reference pixel on the surface of the polyhedron is at an intersection point of the surface of the polyhedron and a connecting line between the initial reference pixel and the center point of the polyhedron.

According to a fourth aspect, a motion compensating prediction apparatus is provided, where the motion compensating prediction apparatus includes a module configured to perform the method in the first aspect.

According to a fifth aspect, a motion compensating prediction apparatus is provided, where the motion compensating prediction apparatus includes a module configured to perform the method in the second aspect.

According to a sixth aspect, a motion compensating prediction apparatus is provided, where the motion compensating prediction apparatus includes a module configured to perform the method in the third aspect.

According to a seventh aspect, a codec is provided. The codec includes a non-volatile storage medium and a central processing unit. The non-volatile storage medium stores an executable program. The central processing unit is connected to the non-volatile storage medium, and executes the executable program to implement the motion compensating prediction method provided in the first aspect of the present invention and extension content thereof.

According to an eighth aspect, a codec is provided. The codec includes a non-volatile storage medium and a central processing unit. The non-volatile storage medium stores an executable program. The central processing unit is connected to the non-volatile storage medium, and executes the executable program to implement the motion compensating prediction method provided in the second aspect of the present invention and extension content thereof.

According to a ninth aspect, a codec is provided. The codec includes a non-volatile storage medium and a central processing unit. The non-volatile storage medium stores an executable program. The central processing unit is connected to the non-volatile storage medium, and executes the executable program to implement the motion compensating prediction method provided in the third aspect of the present invention and extension content thereof.

According to a tenth aspect, a computer readable medium is provided. The computer readable medium stores program code for execution by an image processing device, and the program code includes an instruction used to perform the method in the first aspect.

According to an eleventh aspect, a computer readable medium is provided. The computer readable medium stores program code for execution by an image processing device, and the program code includes an instruction used to perform the method in the second aspect.

According to a twelfth aspect, a computer readable medium is provided. The computer readable medium stores program code for execution by an image processing device, and the program code includes an instruction used to perform the method in the third aspect.

In some embodiments of the present invention, when the initial reference pixel is located outside the second sub-image, the target reference pixel that can actually implement the reference function is found based on the location of the initial reference pixel, and then, the pixel value of the current pixel is predicted based on the target reference pixel. This improves accuracy of motion compensating prediction.

BRIEF DESCRIPTION OF DRAWINGS

To describe technical solutions in embodiments of the present invention more clearly, the following briefly describes the accompanying drawings. The accompanying drawings show merely some embodiments of the present invention, and a person of ordinary skill in the art may still derive other drawings from these accompanying drawings without creative efforts.

FIG. 5 is a schematic flowchart of a motion compensating prediction method according to an embodiment of the present invention;

FIG. 6 is a schematic diagram of a current image and a reference image;

FIG. 8 is a schematic diagram of a current image and a reference image;

FIG. 11 is a schematic diagram of another polyhedron corresponding to a reference image;

FIG. 12 shows a reference image in different layout patterns;

DESCRIPTION OF EMBODIMENTS

The following clearly describes technical solutions in embodiments of the present invention with reference to the accompanying drawings. The described embodiments are some rather than all of the embodiments of the present invention. Other embodiments obtained by a person of ordinary skill in the art based on the described embodiments of the present invention without creative efforts may fall within the protection scope of the present invention.

Figure 1:
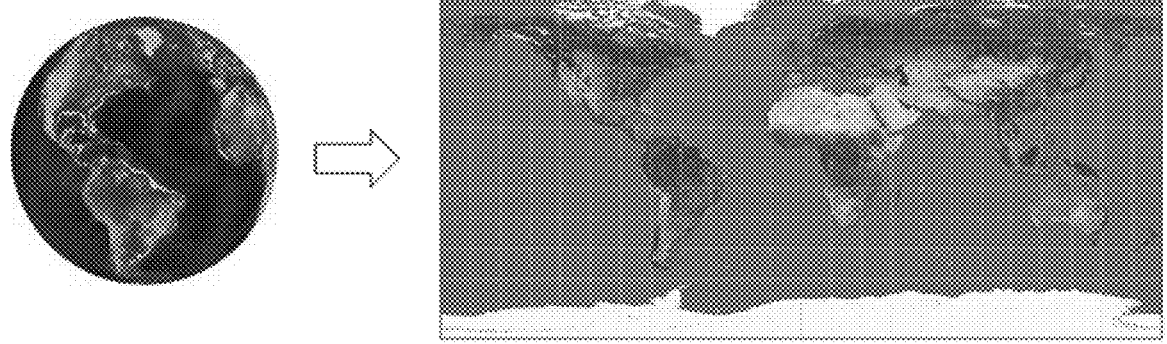
FIG. 1 is a longitude and latitude diagram of a spherical image.
Figure 2:
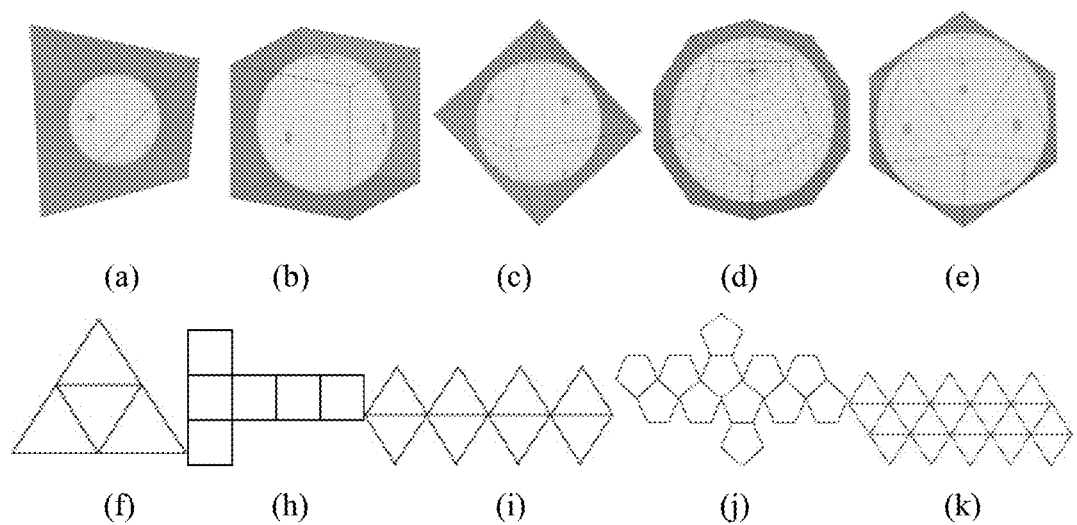
FIG. 2 shows a polyhedron-format two-dimensional image.
Figure 3:
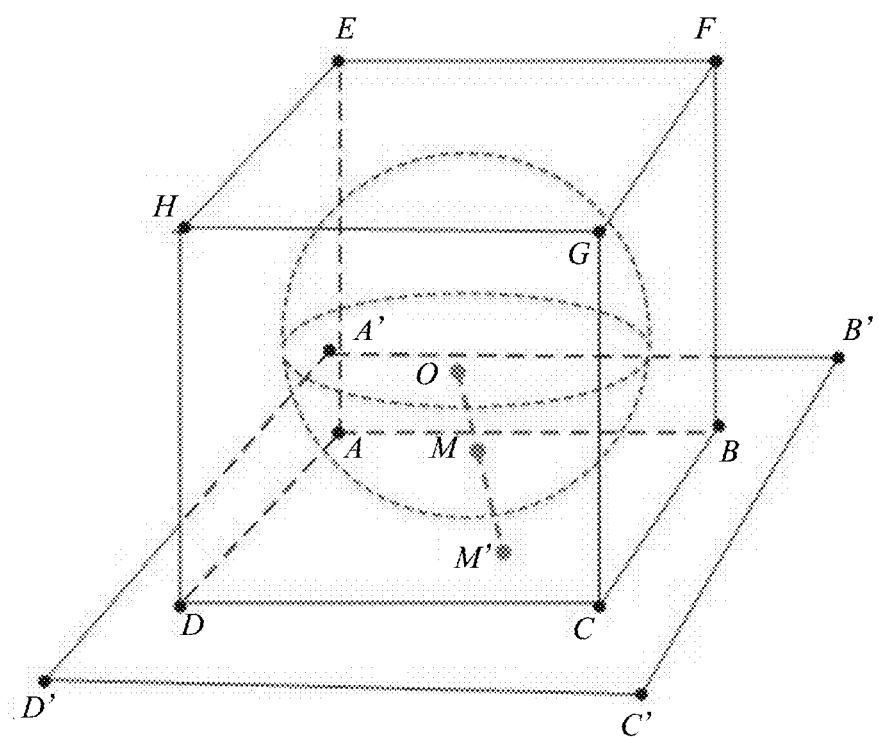
FIG. 3 is a schematic diagram of a spherical image projected into a regular hexahedron.

To help better understand a motion compensating prediction method in the embodiments of the present invention, the following first briefly describes, with reference to FIG. 1 to FIG. 3, a scenario to which the motion compensating prediction method in the embodiments of the present invention is applied.

To support presentation of video image content in all directions, a VR video image usually includes 360-degree omnidirectional visual information in three-dimensional space. The VR video image may be imagined as a map that provides a view of a terrestrial globe from a perspective of a central position inside the terrestrial globe. Typically, the VR video image is also referred to as a panoramic video image (which may be simply referred to as a spherical image).

The spherical image cannot be conveniently represented, stored, and indexed. Therefore, before processing of the spherical image, the spherical image usually needs to be unfolded to obtain a two-dimensional image, and then, operations such as compression, processing, storage, and transmission are performed on the two-dimensional image. A process of unfolding the spherical image to obtain the two-dimensional image is referred to as projection.

As shown in FIG. 1, a common two-dimensional image is referred to as a longitude and latitude diagram. In FIG. 1, images of regions adjacent to the South Pole and the North Pole are stretched to a relatively great extent, and therefore have serious distortion and data redundancy.

To overcome a disadvantage of the longitude and latitude diagram, a spherical image may be projected into a regular polyhedron, so as to transform the spherical image into a polyhedron-format two-dimensional image. As shown in FIG. 2, a spherical image may be projected into a regular tetrahedron (FIG. 2(a)), a regular hexahedron (FIG. 2(b)), a regular octahedron (FIG. 2(c)), a regular dodecahedron (FIG. 2(d)), and a regular icosahedron (FIG. 2(e)). Two-dimensional planar images obtained by projecting the spherical image into all of the foregoing polyhedrons are respectively shown in FIG. 2(f) to FIG. 2(k).

A specific process of projecting a spherical image into a polyhedron is as follows: The spherical image is placed in the polyhedron, so that the spherical image becomes an inscribed sphere of the polyhedron; a center of the sphere or a center of the polyhedron is connected to a point on a surface of the sphere by using a line, and the line is extended to intersect the polyhedron; and a pixel at a location of an intersection point on the polyhedron is a pixel of a corresponding point on the spherical image.

In the following, a process of projecting a spherical image into a regular hexahedron is used as an example with reference to FIG. 3. A surface of a sphere is inscribed into the regular hexahedron ABCDEFGH. To obtain a pixel value at a point M' on the regular hexahedron, a center O of the sphere is connected to M' by using a line, and the line intersects the sphere at a point M on the surface of the sphere. In this case, a pixel at the point M is a pixel at the point M'. Similarly, all pixels in a region ABCD on a plane A'B'C'D' may be obtained according to a same method. The pixels in the region ABCD constitute a face ABCD. The plane A'B'C'D' is a projection plane of the face ABCD.

Figure 4:
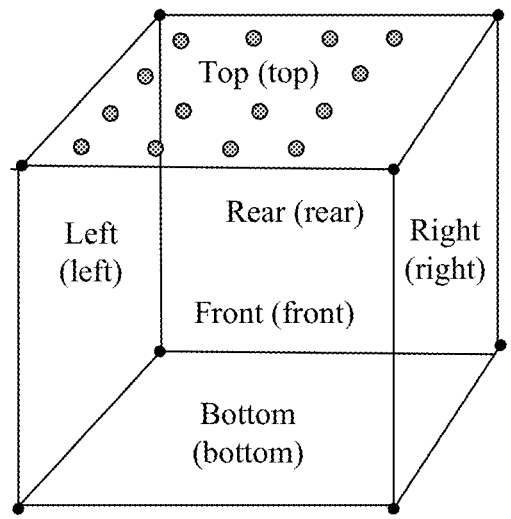
FIG. 4 is a schematic diagram of a regular hexahedron and a two-dimensional image obtained by unfolding the regular hexahedron.

After the spherical image is projected into the regular polyhedron, and a surface of the polyhedron is then unfolded to obtain a two-dimensional image, an image of each face on the surface of the polyhedron becomes an image of a region in the two-dimensional image or a sub-image of the spherical image. For example, a surface of a regular hexahedron in FIG. 4(a) is unfolded to obtain an image in FIG. 4(b), and a face image of a top face on the surface of the hexahedron becomes a sub-image in an upper left corner in FIG. 4(b). The sub-image is referred to as a face image of a top face of a spherical image, and the top face of the spherical image represents a region covered by the face image of the top face. For any pixel on the top face, the top face is referred to as a face on which the pixel is located.

It should be understood that, in the embodiments of the present invention, a face is corresponding to a sub-image. For example, a bottom face is a face of a two-dimensional image, and an image on the bottom face is a first sub-image. In this case, the bottom face is a face corresponding to the first sub-image, and the first sub-image is a sub-image corresponding to the bottom face. As shown in FIG. 2(h), each small rectangular region is a face of a two-dimensional image, and an image that includes pixels in each rectangular region is a sub-image of the two-dimensional image. In other words, a face is a concept of a region, and a sub-image is an image.

In addition, when an operation such as encoding, decoding, or compression is performed on the two-dimensional image, the images shown in FIG. 2(f) to FIG. 2(k) may be directly processed, or an image in a minimum-area rectangular region that encompasses the image may be selected as an object to be processed, and all parts of the rectangular region except any face of the two-dimensional image are filled in with default content or the like, for example, all gray, all black, or all white.

It should be understood that, during encoding and decoding of an image, the image is usually divided into a plurality of image blocks with equal sizes, and then, a reference block is searched for, for each image block. In a process of searching for a reference block for a current image block, there may be different reference cases. Based on a reference direction, prediction may be classified into unidirectional prediction and bidirectional prediction. Unidirectional prediction means that there is one reference image set for a current block (an element in the set is a reference image selected from a reconstructed image), and any reference image in the set may be selected for a code block. Bidirectional prediction means that there are two reference image sets for a current block (an element in each of the two sets is an image independently selected from a reconstructed image, and some or all of reference images in the two sets may be the same), and a reference image may be selected from each of the two sets for a code block. Specifically whether to perform bidirectional prediction or unidirectional prediction and a reference image set construction method are agreed upon by an encoder side and a decoder side together. Alternatively, an encoder side transmits a used method to a decoder side, and the decoder side determines the used method based on a decoding result. When a bidirectional prediction method is used, there are two reference blocks for a current code block, and each reference block requires a motion information indication. The decoder side needs to determine the two reference blocks based on two sets of motion information obtained through decoding. A predicted value of a pixel value of a pixel in the current block is determined based on pixel values of pixels in the two reference blocks.

Actually, when a reference block of a current block is determined, and prediction is performed on the current block based on the reference block, a reference pixel in the reference block is actually determined for a current pixel in the current block, and a predicted value of a pixel value of the current pixel is predicted based on a pixel value of the reference pixel. The following describes in detail the motion compensating prediction method in the embodiments of the present invention.

FIG. 5 is a schematic flowchart of a motion compensating prediction method according to an embodiment of the present invention. The method includes the following steps.

110: Determine a location of an initial reference pixel of a current pixel in a reference image, where the current pixel is located in a first sub-image of a current image.

It should be understood that both the current image and the reference image are polyhedron-format two-dimensional images into which spherical images are transformed.

It should be understood that, during prediction processing of the current image, the current image may be divided into a plurality of image blocks, and then, each image block is processed. The current pixel may be a pixel in an image block in the current image. Specifically, the to-be-processed current pixel may be located in an image block in the first sub-image.

Specifically, a decoder may determine the location of the initial reference pixel in the reference image based on a location of the current pixel and current-pixel motion information that is obtained by decoding a motion information code stream. For example, the reference image is determined based on reference image indication information in motion information, and the location of the initial reference pixel in the reference image is determined based on motion vector information in the motion information and the location of the current pixel. In a motion search process, when an encoder searches a reference image for a reference block for a current block, or searches for a reference pixel for a current pixel, a location of a current reference pixel is the location of the initial reference pixel.

It is assumed that polyhedrons corresponding to the current image and the reference image are regular hexahedrons. FIG. 6(a) is the current image (the current pixel is in the current image), and FIG. 6(b) is the reference image (the initial reference pixel is in the reference image). Both the current image and the reference image include six sub-images. The six sub-images are top (top), front (front), right (right), rear (rear), left (left), and bottom (bottom). The sub-image herein may be considered as an array including some pixels, and these pixels are located on a same projection plane when a surface of a sphere is projected to a polyhedron. After the polyhedron is unfolded to obtain a two-dimensional image, each face of the polyhedron becomes a part of the two-dimensional image. It is assumed that the current pixel is P, and P is in a bottom sub-image in the current image. It is assumed that the initial reference pixel is T, and T is in a front sub-image in the reference image. In other words, T is not in a bottom sub-image in the reference image. It should be understood that, in FIG. 6(a), the first sub-image is the bottom sub-image, and in FIG. 6(b), a second sub-image is the bottom sub-image. The first sub-image and the second sub-image are sub-images located at corresponding locations in the current image and the reference image, respectively.

120: When the initial reference pixel is located outside a second sub-image that is in the reference image and that is at a location corresponding to the first sub-image, determine a location of a target reference pixel of the current pixel in the reference image based on the location of the initial reference pixel, where a connecting line between a location of the target reference pixel on a surface of a polyhedron corresponding to the reference image and a location of the initial reference pixel on a first plane passes through a center point of the polyhedron, the location of the target reference pixel on the surface of the polyhedron is determined based on the location of the initial reference pixel and layout information of the polyhedron corresponding to the reference image, and the first plane is a plane on which a face, of the polyhedron, corresponding to the second sub-image is located.

It should be understood that, when the initial reference pixel is located in the second sub-image that is in the reference image and that is at the location corresponding to the first sub-image, prediction may be performed on the current pixel directly based on the initial reference pixel, with no need to search for the target reference pixel.

The polyhedron corresponding to the reference image may be a polyhedron formed by the reference image, in other words, a polyhedron formed by folding all sub-images of the reference image according to a specific rule.

Optionally, the method further includes: determining, based on layout information of the reference image and the location of the initial reference pixel, whether the initial reference pixel is located outside the second sub-image in the reference image.

During determining of whether the initial reference pixel is outside the second sub-image, the location of the initial reference pixel in the reference image needs to be first determined. During determining of the location of the initial reference pixel, the decoder and the encoder specifically perform the following processes of determining:

The decoder may determine the location of the initial reference pixel in the reference image based on the location of the current pixel and the current-pixel motion information that is obtained by decoding the motion information code stream. For example, the decoder may determine the reference image based on the reference image indication information in the motion information, and determine the location of the initial reference pixel in the reference image based on the motion vector information in the motion information and the location of the current pixel.

When the encoder searches for a reference block for a current block, or searches for a reference pixel for the current pixel, a location of a current reference pixel is the location of the initial reference pixel.

Optionally, the layout information of the polyhedron corresponding to the reference image includes at least one of face quantity information of the polyhedron corresponding to the reference image, sub-image arrangement manner information of the reference image, sub-image arrangement sequence information of the reference image, and sub-image rotation information of the reference image.

Specifically, the face quantity information of the polyhedron corresponding to the reference image may be specifically what polyhedron the reference image is corresponding to. Specifically, the face quantity information of the polyhedron may indicate that the reference image is corresponding to a regular hexahedron.

Figure 7:
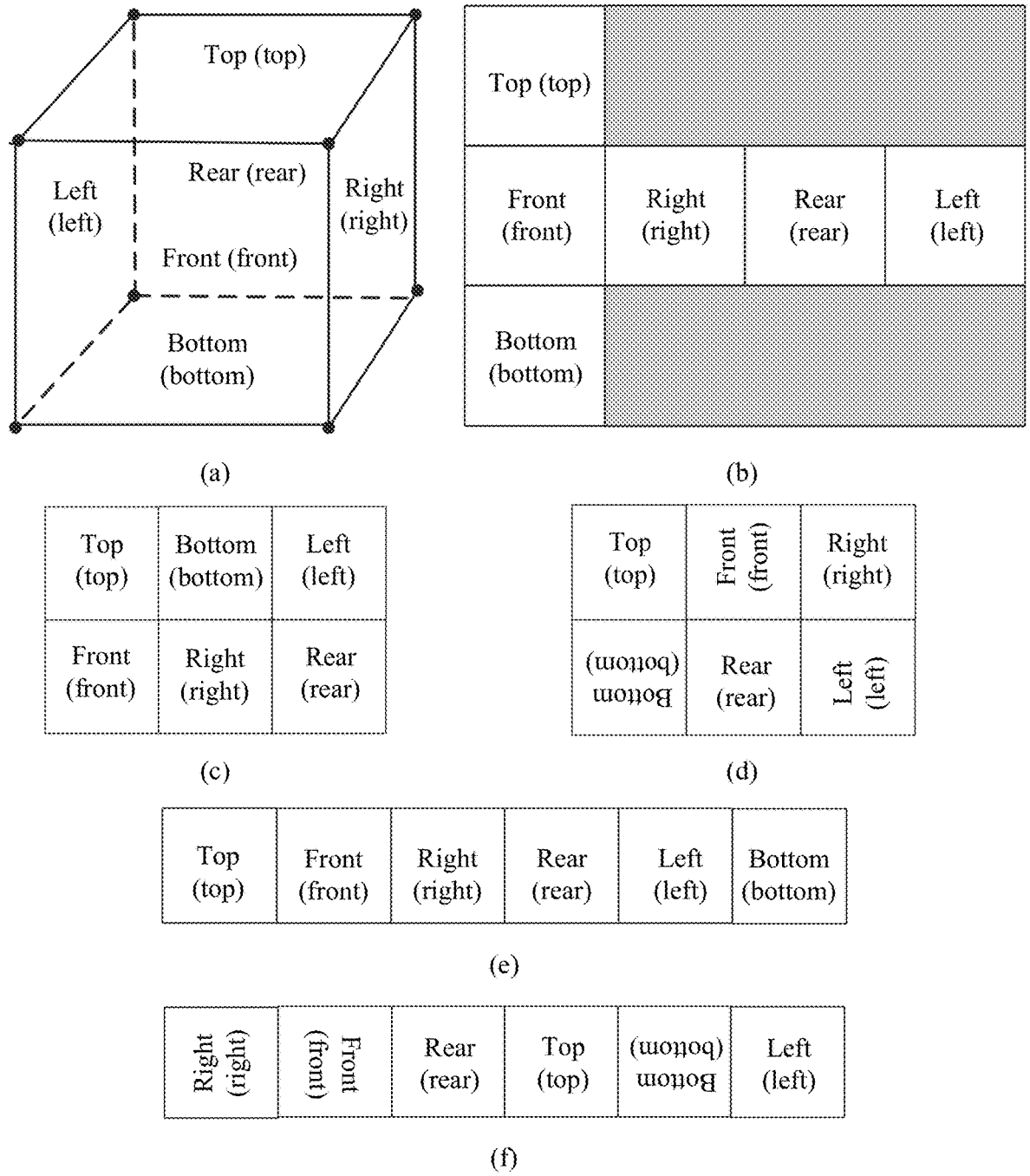
FIG. 7 is a schematic diagram of a reference image in different layout patterns.

The sub-image arrangement manner information of the reference image is an arrangement manner of all sub-images in the reference image. As shown in FIG. 7, a reference image is corresponding to a regular hexahedron. In this case, the reference image includes six sub-images, and arrangement of the six sub-images may be in a 4×3 pattern (FIG. 7(b)), a 3×2 pattern (FIG. 7(c) and FIG. 7(d)), or a 6×1 pattern (FIG. 7(e) and FIG. 7(f)).

The sub-image arrangement sequence information of the reference image is an arrangement sequence of all the sub-images in the reference image. For example, both FIG. 7(c) and FIG. 7(d) are 3×2-pattern images. In FIG. 7(c), a sub-image corresponding to a front face is arranged in a lower left corner of the image. In FIG. 7(d), a sub-image corresponding to a front face is arranged in the middle of a first row.

The sub-image rotation information of the reference image may be a rotation angle of a sub-image of the reference image. Assuming that a placement location of each sub-image in FIG. 7(c) is used as a reference, in FIG. 7(d), a rotation angle of the sub-image corresponding to the front face is −90 degrees.

130: Determine a predicted value of a pixel value of the current pixel based on a pixel value of the target reference pixel and/or a pixel value of a pixel near the target reference pixel.

In this embodiment of the present invention, when the initial reference pixel is located outside the second sub-image, the target reference pixel that can actually implement a reference function is found based on the location of the initial reference pixel, and then, the pixel value of the current pixel is predicted based on the target reference pixel. This improves accuracy of motion compensating prediction.

Optionally, in an embodiment, the determining a location of a target reference pixel of the current pixel in the reference image based on the location of the initial reference pixel and the layout information of the reference image includes: determining the location of the target reference pixel on the surface of the polyhedron based on the location of the initial reference pixel and the layout information of the reference image, where the location of the target reference pixel on the surface of the polyhedron is at an intersection point of the surface of the polyhedron and a connecting line between the initial reference pixel and the center point of the polyhedron; and determining the location of the target reference pixel in the reference image based on the location of the target reference pixel on the surface of the polyhedron and the layout information of the reference image.

The following describes, in detail with reference to an instance 1 and an instance 2, a process of determining the location of the target reference pixel on the surface of the polyhedron based on the location of the initial reference pixel and the layout information of the reference image.

Instance 1:

In FIG. 8, FIG. 8(a) is a current image, and FIG. 8(b) is a reference image. P is a current pixel in the current image, and P is located on a bottom face of the current image. P' is a pixel that is at a same location as P in the reference image, and P' is located on a bottom face of the reference image. $T_1$, $T_2$, and $T_3$ are all initial reference pixels of the current pixel, and are all located outside the bottom face of the reference image.

Figure 9:
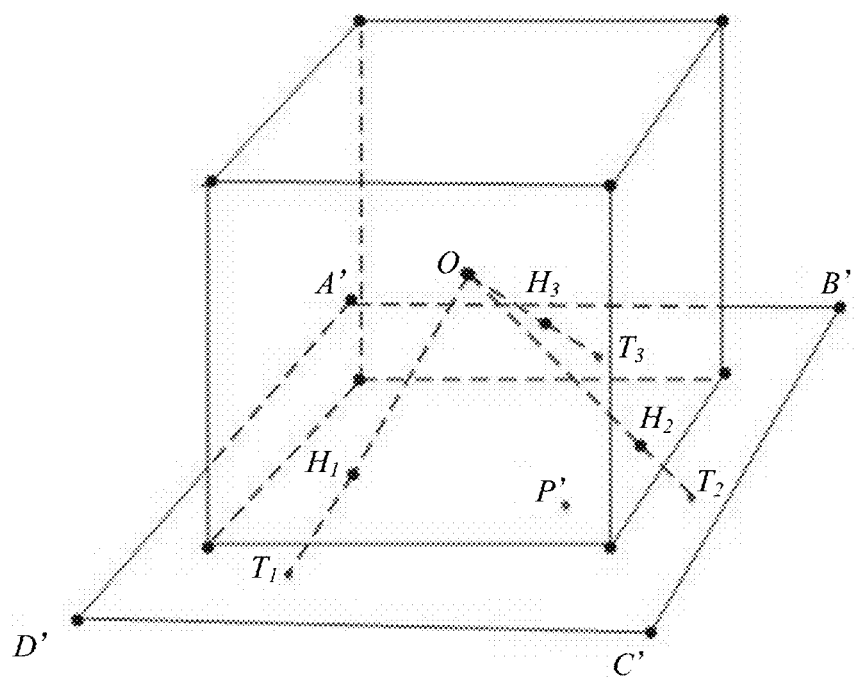
FIG. 9 is a schematic diagram of a regular hexahedron corresponding to a reference image.

A regular hexahedron in FIG. 9 is a polyhedron that is corresponding to the reference image and that is constructed by using the bottom face of the reference image as a bottom face. FIG. 9 shows three current reference pixels $T_1$, $T_2$, and $T_3$ in FIG. 8(b). It can be learned from FIG. 9 that pixels that are corresponding to three target reference pixels and that are on the regular hexahedron are $H_1$, $H_2$, and $H_3$. $H_1$, $H_2$, and $H_3$ are located at intersection points of the regular hexahedron and connecting lines between $T_1$ and O, $T_2$ and O, and $T_3$ and O, respectively. In this way, locations of $H_1$, $H_2$, and $H_3$ can be determined based on locations of $T_1$, $T_2$, and $T_3$. It should be understood that, in FIG. 9, $T_1$, $T_2$, and $T_3$ merely represent cases of the initial reference pixel at different locations. Actually, there is only one reference pixel at one time.

Figure 10:
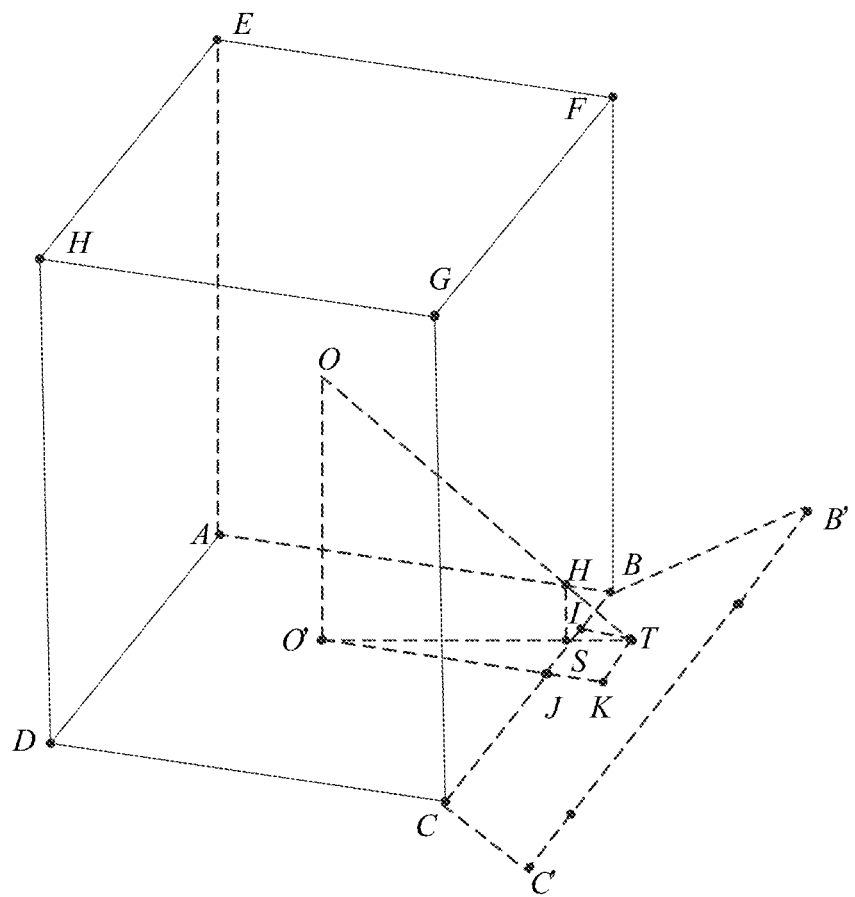
FIG. 10 is a schematic diagram of a regular hexahedron corresponding to a reference image.

The following uses FIG. 10 as an example to describe in detail how to determine, based on the location of the initial reference pixel, a location of a pixel that is corresponding to the target reference pixel and that is on the polyhedron.

Specifically, $T_1$ is used as an example to describe in detail how to determine, based on a location of $T_1$, a projection location of a projection pixel of the target reference pixel on the surface of the polyhedron.

A regular hexahedron in FIG. 10 is a polyhedron that is corresponding to the reference image and that is constructed by using the bottom face of the reference image as a bottom face. To be specific, an anchor face of the regular hexahedron (an anchor face may be understood as a bottom face for constructing a polyhedron; for example, a face of the reference image is used as a bottom face of the constructed polyhedron, and the bottom face is an anchor face of the polyhedron) is the bottom face of the reference image. An edge length of the regular hexahedron is a, and O is a center of the regular hexahedron. A location of T is the location of the initial reference pixel. A plane ABCD is a plane on which a pixel at a same location as the current pixel in the reference image is located. Herein, O' is an upright projection of O on the plane ABCD in a plane normal direction on a projection plane on which the plane ABCD on which the current pixel is located is located; J is a midpoint of a side BC; K is an upright projection of T on an extension line O'J; OT intersects a plane BCGF at a point H (a location of the point H is a location of a projection pixel of the initial reference pixel). An upright projection of the point H on BC is S, and I is an upright projection of T on the side BC. Because the edge length of the regular hexahedron is a, lengths of OO' and O'J are both $$\frac{a}{2}.$$

It is assumed that a length of a line segment JK is x, and a length of a line segment KT is y. In this case, the following may be obtained based on a similar triangle:

$$L_{SJ} = \frac{a/2 * y}{a/2 + x}; \tag{1}$$

and $$L_{SH} = \frac{a/2 * \sqrt{x^2 + \left(\frac{xy}{a/2+x}\right)^2}}{\sqrt{(x+a/2)^2 + y^2}}. \tag{2}$$

$L_{SJ}$ is a length of SJ, and $L_{SH}$ is a length of SH. After the length of SJ and the length of SH are obtained based on formula (1) and formula (2), a location of the point H on a surface of the regular hexahedron may be determined. It should be understood that the length of SJ and the length of SH may be determined based on location coordinates of the initial reference pixel, to further obtain the location of the point H on the surface of the regular hexahedron. Formula (2) may also be simplified into the following form based on a similar-triangle relationship:

$$L_{SH} = \frac{a/2 * x}{a/2 + x} \tag{2a}$$

The foregoing formula (2a) may also be obtained based on a geometric relationship between similar triangles shown in FIG. 10. A specific process is as follows:

In a triangle $OO'T$, $\frac{L_{SH}}{L_{OO'}} = \frac{L_{ST}}{L_{O'T}}.$ (a)

In a triangle $O'KT$, $\frac{L_{ST}}{L_{O'T}} = \frac{L_{JK}}{L_{O'K}}.$ (b)

The foregoing formula (a) and formula (b) are combined to obtain $$\frac{L_{ST}}{L_{O'T}} = \frac{L_{JK}}{L_{O'K}}$$

(c).

The length of OO' is $$\frac{a}{2},$$

the length of JK is x, and a length of O'K is $$\frac{a}{2} + x.$$

Formula (2a) can be obtained by substituting the foregoing values into the foregoing formula (c).

Instance 2:

As shown in FIG. 11, the polyhedron corresponding to the reference image includes two faces ACB and DBC (the polyhedron may further include another face, which is not listed herein). The face ACB is a face on which a pixel at a same location as the current pixel in the reference image is located. Herein, O is a center of the polyhedron, and O' is an upright projection of O on the face ABC. A location of T is the location of the initial reference pixel; O'T intersects a side BC at a point S; OT intersects the face BCD at a point H; H" is an upright projection of H on O'K; L is an upright projection of H" on O'K; I is an upright projection of T on BC.

As shown in FIG. 11(a), it is known that a length of OO' is $L_{OO'}$, a length of O'J is $L_{O'J}$, a length of JK is $L_{JK}$, a length of KT is $L_{KT}$, an included angle between the face ACB and the face BCD is α (α is greater than 90°), and ∠O'SH=θ.

In this case, the following can be obtained:

$$L_{O'K} = L_{O'J} + L_{JK} \tag{3}$$

$$L_{SJ} = \frac{L_{O'J} * L_{KT}}{L_{O'K}} \quad (4)$$

$$L_{O'T} = \sqrt{L_{O'K}^2 + L_{KT}^2} \quad (5)$$

$$L_{OT} = \sqrt{L_{O'O}^2 + L_{O'K} + L_{KT}^2} \quad (6)$$

$$L_{ST} = \frac{L_{JK}}{L_{O'K}} * L_{O'T} \quad (7)$$

$$L_{O'S} = \frac{L_{O'J}}{L_{O'K}} * L_{O'T} \quad (8)$$

$$L_{SH'} = \frac{L_{OO'} * L_{ST}}{L_{O'T} * \tan(\pi - \theta) + L_{OO'}} \quad (9)$$

$$L_{O'H'} = L_{O'S} + L_{SH'} \quad (10)$$

$$L_{HH'} = \frac{L_{O'H'} * L_{KT}}{L_{O'T}} \quad (11)$$

$$L_{H''L} = \frac{L_{H'T} * L_{OO'}}{L_{O'T}} \quad (12)$$

$$L_{H''J} = \frac{L_{H''L}}{\sin(\pi - \alpha)} \quad (13)$$

When an included angle between neighboring faces of the polyhedron is greater than 90°, $$L_{SJ} = \frac{L_{O'J} * L_{KT}}{L_{O'K}} \text{ and } L_{H''J} = \frac{L_{H''L}}{\sin(\pi - \alpha)}$$

can be finally obtained based on the foregoing formula (4) and formula (13). After $L_{SJ}$ and $L_{H'J}$ are obtained, the projection location of the target reference pixel on the surface of the polyhedron may be further determined.

In FIG. 11(b), an included angle α between the face ACB and the face BCD is less than 90°. In this case:

$$L_{SH'} = \frac{L_{OO'} * L_{ST}}{L_{O'T} * \tan(\theta) - L_{OO'}} \quad (14)$$

$$L_{O'H'} = L_{O'S} - L_{SH'} \quad (15)$$

$$L_{HH'} = \frac{L_{O'H'} * L_{KT}}{L_{O'T}} \quad (16)$$

$$L_{H''L} = \frac{L_{H'T} * L_{OO'}}{L_{O'T}} \quad (17)$$

$$L_{H''J} = \frac{L_{H''L}}{\sin(\alpha)} \quad (18)$$

When an included angle between neighboring faces of the polyhedron is less than 90°, $$L_{SJ} = \frac{L_{O'J} * L_{KT}}{L_{O'K}} \text{ and } L_{H''J} = \frac{L_{H''L}}{\sin(\alpha)}$$

can be finally obtained based on the foregoing formula (4) and formula (18). After $L_{SJ}$ and $L_{H'J}$ are obtained, the projection location of the target reference pixel on the surface of the polyhedron may be further determined.

In a common regular polyhedron, an included angle between neighboring faces of a tetrahedron is less than 90°, an included angle between neighboring faces of a regular hexahedron is 90°, and an included angle between neighboring faces of a regular octahedron or a more complex polyhedron is greater than 90°. For an image in another polyhedron format, a corresponding parameter may be obtained according to a similar method, to finally obtain $L_{SJ}$ and $L_{H'J}$, thereby determining a location of a projection pixel of the target reference pixel on the surface of the polyhedron. It should be understood that the location of the projection pixel herein is a location of the intersection point of the surface of the polyhedron and the connecting line between the initial reference pixel and the center of the polyhedron.

Optionally, in an embodiment, the determining the location of the target reference pixel on the surface of the polyhedron based on the location of the initial reference pixel and the layout information of the reference image includes: determining the location of the initial reference pixel on the first plane based on the location of the initial reference pixel and the layout information of the reference image; and determining the location of the target reference pixel on the surface of the polyhedron based on the location of the initial reference pixel on the first plane and the layout information of the reference image.

Optionally, a point at the location of the target reference pixel on the surface of the polyhedron may be understood as the projection pixel of the target reference pixel. In this case, the determining a location of a target reference pixel of the current pixel in the reference image based on the location of the initial reference pixel specifically includes: determining a location of a projection pixel of the target reference pixel on the surface of the polyhedron based on the location of the initial reference pixel and the layout information of the reference image, where the location of the projection pixel on the surface of the polyhedron is at the intersection point of the surface of the polyhedron and the connecting line between the initial reference pixel and the center point of the polyhedron; and determining the location of the target reference pixel in the reference image based on the location of the projection pixel on the surface of the polyhedron and the layout information of the reference image.

The following specifically describes, with reference to FIG. 12 and by using a two-dimensional image in a regular-hexahedron format as an example, how to determine the location of the target reference pixel in the reference image. As shown in FIG. 12(a), it is assumed that an edge length of a regular hexahedron corresponding to the reference image is a, a layout pattern of the reference image is 4×3, the target reference pixel of the current pixel is projected to a point $H_1$ on a front face of the regular hexahedron, and a horizontal distance and a vertical distance between H1 and a vertex in an upper left corner of the front face are Δx and Δy, respectively. The following describes how to determine locations, in the reference image, of the target reference pixel in the two-dimensional image in different layout patterns.

In FIG. 12(b), an image width is 4a, an image height is 3a, and the front face is located in a lower left corner, and is not rotated. In this case, a location of $H_1$ in the reference image relative to a vertex Q in the upper left corner of the reference image is (Δx, a+Δy).

In FIG. 12(c), the front face is still located at the same location as in FIG. 12(b) in the lower left corner, but is clockwise rotated 90 degrees. In this case, a location of $H_1$ in the reference image relative to a vertex Q in the upper left corner of the reference image is (a−Δy, 2a+Δx).

Optionally, in an embodiment, the determining a predicted value of a pixel value of the current pixel based on a pixel value of the target reference pixel and/or a pixel value of a pixel near the target reference pixel includes: determining the pixel value of the target reference pixel as the predicted value of the pixel value of the current pixel.

The pixel value of the target reference pixel may be a pixel value at the location of the target reference pixel. Directly determining the pixel value of the target reference pixel as the predicted value of the current pixel can simplify a calculation process.

Optionally, in an embodiment, the determining a predicted value of a pixel value of the current pixel based on a pixel value of the target reference pixel and/or a pixel value of a pixel near the target reference pixel includes:

performing weighted processing on the pixel value of the target reference pixel and the pixel value of the pixel near the target reference pixel; and determining a pixel value that is obtained through the weighted processing and that is at the location of the target reference pixel, as the predicted value of the pixel value of the current pixel.

The weighted processing may be smooth filtering processing performed on the target reference pixel and the pixel around the target reference pixel. To be specific, average processing is performed on pixel values of a plurality of pixels including the target reference pixel, and an obtained average value of the pixel values is used as the predicted value of the pixel value of the current pixel.

During prediction of the pixel value of the current pixel, the pixel value of the target reference pixel may be directly used as the predicted value of the pixel value of the current pixel. Alternatively, instead of predicting the pixel value of the current pixel by using only the pixel value of the target reference pixel, the pixel value of the current pixel is predicted based on the target reference pixel and the pixel near the target reference pixel.

Optionally, in an embodiment, the determining a predicted value of a pixel value of the current pixel based on a pixel value of the target reference pixel and/or a pixel value of a pixel near the target reference pixel includes: performing an interpolation operation at the location of the target reference pixel based on the pixel value of the pixel near the target reference pixel; and determining a pixel value obtained through the interpolation operation, as the predicted value of the pixel value of the current pixel.

After the pixel value of the target reference pixel is determined, precision of the pixel value of the target reference pixel may be first determined. When the precision of the pixel value of the target reference pixel is less than motion vector precision of the current pixel, the pixel value of the pixel around the target reference pixel needs to be calculated by using an interpolation algorithm, and the pixel value obtained through calculation is used as the pixel value of the target reference pixel. Specifically, when the precision of the pixel value of the target reference pixel is ½ pixel precision, and the motion vector precision of the current pixel is ¼ pixel precision, the precision of the pixel value of the target reference pixel is less than the motion vector precision of the current pixel. Therefore, the pixel value of the target reference pixel needs to be recalculated by using the interpolation algorithm.

Figure 13:
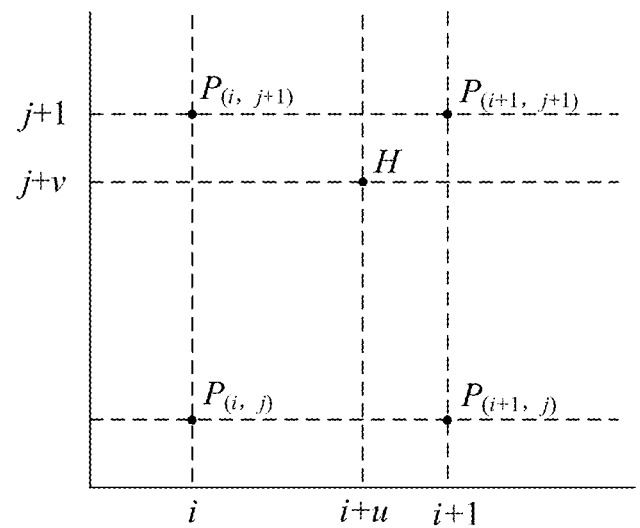
FIG. 13 is a schematic diagram of nearby pixels around a target reference pixel.

Specifically, as shown in FIG. 13, coordinates of a projected point H are (i+u, j+v), where both i and j are nonnegative integers, and both u and v are floating point numbers in a range [0, 1). Location coordinates of four integer pixels near H are $P_{(i,j)}$, $P_{(i,j+1)}$, $P_{(i,j+1)}$, and $P_{(i+1,j+1)}$.

If a bi-linear interpolation algorithm is used, a pixel value at H can be obtained as follows:

$$P_H = P_{(i,j)}(1-u)(1-v) + P_{(i,j+1)}(u)(1-v) + P_{(i,j+1)}(1-u)(v) + P_{(i+1,j+1)}(u)(v) \quad (19)$$

If a bicubic interpolation algorithm is used, the coordinates of the projected point H are still (i+u, j+v), and coordinates of 16 neighboring points around the point H are respectively $P_{(i-1,j-1)}$, $P_{(i-1,j+0)}$, $P_{(i-1,j+1)}$, $P_{(i-1,j+2)}$, $P_{(i+0,j-1)}$, $P_{(i+0,j+0)}$, $P_{(i+0,j+1)}$, $P_{(i+0,j+2)}$, $P_{(i+1,j-1)}$, $P_{(i+1,j+0)}$, $P_{(i+1,j+1)}$, $P_{(i+1,j+2)}$, $P_{(i+2,j-1)}$, $P_{(i+2,j+0)}$, $P_{(i+2,j+1)}$, and $P_{(i+2,j+2)}$.

When the bicubic interpolation algorithm is used, a pixel value at H is obtained as follows:

$$P_H = [A] * [B] * [C]; \quad (20)$$

$$[A] = [S(u+1) \ S(u+0) \ S(u-1) \ S(u-2)]; \quad (21)$$

$$[B] = \begin{bmatrix} P_{(i-1,j-1)} & P_{(i-1,j+0)} & P_{(i-1,j+1)} & P_{(i-1,j+2)} \\ P_{(i+0,j-1)} & P_{(i+0,j+0)} & P_{(i+0,j+1)} & P_{(i+0,j+2)} \\ P_{(i+1,j-1)} & P_{(i+1,j+0)} & P_{(i+1,j+1)} & P_{(i+1,j+2)} \\ P_{(i+2,j-1)} & P_{(1+2,j+0)} & P_{(i+2,j+1)} & P_{(i+2,j+2)} \end{bmatrix}; \quad (22)$$

$$[C] = \begin{bmatrix} S(v+1) \\ S(v+0) \\ S(v-1) \\ S(v-2) \end{bmatrix}; \quad (23)$$

and $$S(x) = \begin{cases} 1 - 2|x|^2 + |x|^3, & |x| \le 1 \\ 4 - 8|x| + 5|x|^2 - |x|^3, & 1 < |x| < 2 \\ 0, & |x| > 2 \end{cases} \quad (24)$$

The foregoing merely uses the bi-linear interpolation algorithm and the bicubic interpolation algorithm as examples to describe in detail how to determine a pixel value at a location of a projection pixel by using an interpolation algorithm in this embodiment of the present invention. Actually, a Lanczos interpolation algorithm, a nearest-neighbor interpolation algorithm, some non-resolution interpolation methods based on information such as an image structure, and the like may also be used.

It should be understood that, after the pixel value of the target reference pixel is determined, the pixel value of the target reference pixel may be directly determined as the pixel value of the current pixel without considering whether the pixel value of the target reference pixel meets a corresponding requirement. In addition, whether the pixel value of the target reference pixel meets a preset requirement may be alternatively determined after the pixel value of the target reference pixel is determined. When the pixel value of the target reference pixel does not meet the requirement, the interpolation operation may be performed on the target reference pixel based on the pixel value of the pixel near the target reference pixel, and the obtained pixel value is used as the predicted value of the pixel value of the current pixel. Alternatively, the weighted processing may be performed on the pixel value of the target reference pixel and the pixel value of the pixel near the target reference pixel, and a result obtained through the weighted processing is used as the predicted value of the pixel value of the current pixel.

Figure 14:
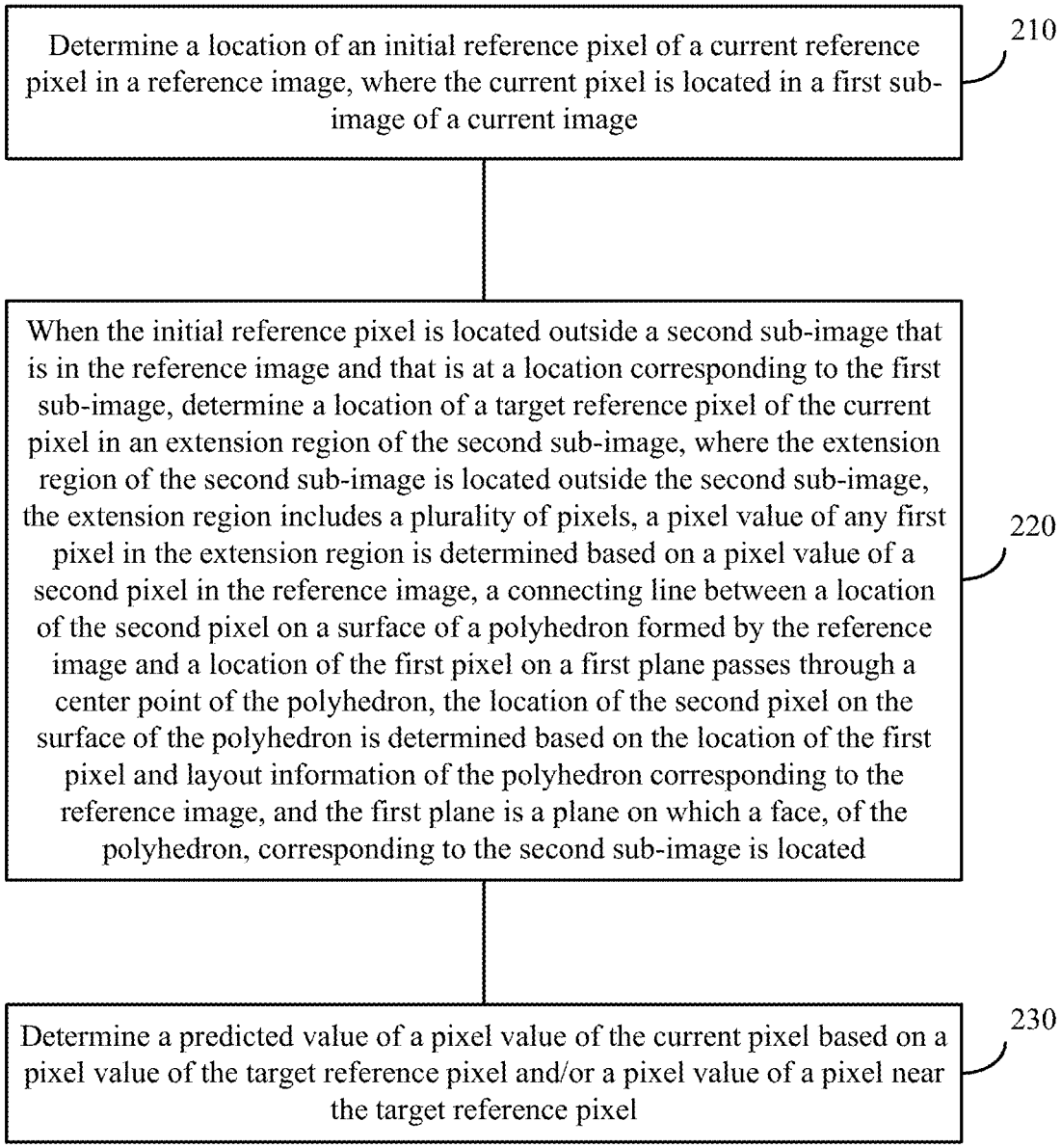
FIG. 14 is a schematic flowchart of a motion compensating prediction method according to an embodiment of the present invention.

FIG. 14 is a schematic flowchart of a motion compensating prediction method according to an embodiment of the present invention. The method shown in FIG. 14 includes the following steps.

210: Determine a location of an initial reference pixel of a current pixel in a reference image, where the current pixel is located in a first sub-image of a current image.

220: When the initial reference pixel is located outside a second sub-image that is in the reference image and that is at a location corresponding to the first sub-image, determine a location of a target reference pixel of the current pixel in an extension region of the second sub-image, where the extension region of the second sub-image is located outside the second sub-image, the extension region includes a plurality of pixels, a pixel value of any first pixel in the extension region is determined based on a pixel value of a second pixel in the reference image, a connecting line between a location of the second pixel on a surface of a polyhedron formed by the reference image and a location of the first pixel on a first plane passes through a center point of the polyhedron, the location of the second pixel on the surface of the polyhedron is determined based on the location of the first pixel and layout information of the polyhedron corresponding to the reference image, and the first plane is a plane on which a face, of the polyhedron, corresponding to the second sub-image is located.

230: Determine a predicted value of a pixel value of the current pixel based on a pixel value of the target reference pixel and/or a pixel value of a pixel near the target reference pixel.

In this embodiment of the present invention, when the initial reference pixel is located outside the second sub-image, the target reference pixel that can actually implement a reference function is searched for directly in the extension region based on the current pixel and motion information of the current pixel, and then, the pixel value of the current pixel is predicted based on the target reference pixel. In this way, the target reference pixel can be quickly found, and further, accuracy of motion prediction estimation can be improved.

It should be understood that a pixel value of a pixel in the extension region may be calculated according to the foregoing method shown in FIG. 5. In this way, during prediction of the pixel value of the current pixel, the target reference pixel can be found directly in the extension region, and the pixel value of the current pixel can be quickly predicted.

Optionally, in an embodiment, the method shown in FIG. 14 further includes: determining the location of the second pixel on the surface of the polyhedron based on the location of the first pixel and layout information of the reference image, where the location of the second pixel on the surface of the polyhedron is at an intersection point of the surface of the polyhedron and a connecting line between the first pixel and the center point of the polyhedron; and determining a location of the second pixel in the reference image based on the location of the second pixel on the surface of the polyhedron and the layout information of the reference image.

Optionally, in an embodiment, the method shown in FIG. 14 further includes the following.

Specifically, the motion compensating prediction method shown in FIG. 14 is first determining an extension region of a sub-image of the reference image and then determining a location of a reference pixel in the extension region. In this way, during prediction of the current pixel, the reference pixel can be found directly in the extension region, and prediction is performed on the current pixel based on a pixel value of the reference pixel. The following describes the foregoing process in detail with reference to FIG. 15. Specific steps are as follows.

201: Construct, in the reference image, an extension region for a face that is at a location corresponding to the current pixel.

Figure 15C:
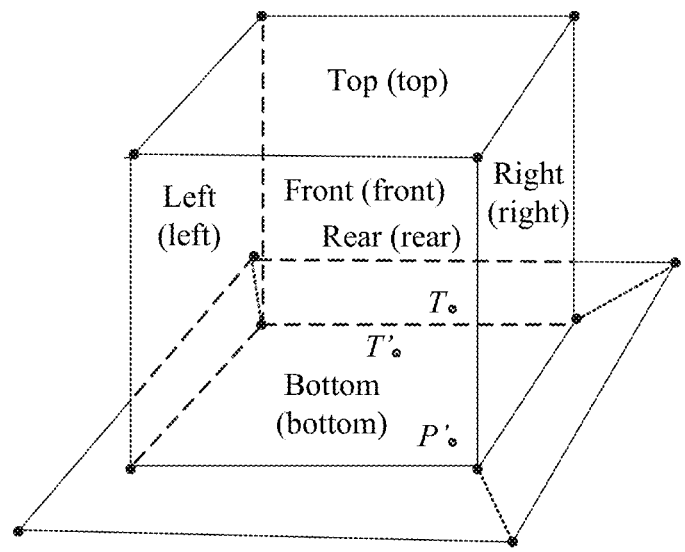
FIG. 15 is a schematic diagram of an extension region.
Figure 15D:
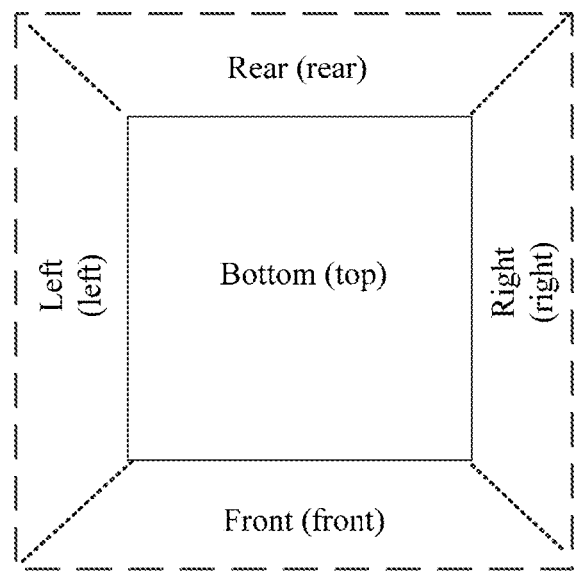

A face on which the current pixel is located is determined based on the layout information of the polyhedron corresponding to the reference image (usually, the layout information of the polyhedron corresponding to the reference image is the same as that of the current image, and therefore may be used to determine a face on which a pixel in the current image is located) and the location of the current pixel. The face that is corresponding to the current pixel and that is in the reference image is found, the extension region is constructed for the corresponding face, and a pixel value of a pixel in the extension region is determined. A specific effect of the extension region is similar to expanding or patching the face around the face. As shown in FIG. 15(*a*), a current pixel P is located on a bottom face. In this case, an extension region needs to be constructed for the bottom face in the reference image. A range of the extension region is shown by a dashed-line region outside the bottom face in FIG. 15(*b*). During calculation of a pixel value of a pixel in the extension region, a polyhedron that is shown in FIG. 15(*c*) and that is corresponding to the reference image may be constructed by using a bottom of the reference image as a bottom face. If the polyhedron is unfolded, locations of faces such as a rear face, a front face, a left face, and a right face of the polyhedron in the extension region are shown in FIG. 15(*d*). For any first pixel in the extension region, the location of the second pixel corresponding to the first pixel in the reference image may be finally determined based on a location of the first pixel, a face on which a current pixel corresponding to the first pixel is located, and the layout information of the polyhedron corresponding to the reference image, according to the foregoing motion compensating prediction method in the embodiment of the present invention shown in FIG. 5. Then, a pixel value at the location of the second pixel is determined, and finally, the pixel value at the location of the second pixel is used as a pixel value of the first pixel. Herein, the first pixel is similar to the initial reference pixel in the motion compensating prediction method in the embodiment of the present invention shown in FIG. 5, and the second pixel is similar to the target reference pixel in the motion compensating prediction method in the embodiment of the present invention shown in FIG. 5.

202: Determine a location of a target reference pixel of the current pixel in the extension region.

First, a reference pixel of the current pixel is determined, and whether the reference pixel is located on a face on which the current pixel is located is determined based on the face on which the current pixel is located and a location of the reference pixel. If the reference pixel is located on the face on which the current pixel is located, a pixel value at the location of the reference pixel may be directly used as the predicted value of the pixel value of the current pixel. Otherwise, the following operation needs to be performed: The corresponding location of the reference pixel in the extension region is first determined based on a relative location offset between the reference pixel and the current pixel. As shown in FIG. 15(*b*), a reference pixel T is not located on a face on which a current pixel P is located. Based on a relative location offset between the reference pixel and the current pixel, it can be learned that the reference pixel T should be located in a region corresponding to the rear face in the extension region. If the extension region is placed based on an actual relative spatial location, as shown in FIG. 15(*d*), the location of the reference pixel in the extension region is determined based on the relative location offset. Otherwise, the location of the reference pixel in the extension region needs to be determined depending on a specific extension-region placement method.

203: Determine the predicted value of the pixel value of the current pixel.

After the corresponding location of the reference pixel in the extension region is determined, a pixel value at the location is used as the predicted value of the pixel value of the current pixel.

It should be understood that the pixel in the extension region may be an integer pixel, or may be a fraction pixel. If the pixel is the fraction pixel, a specific pixel value may be ½ precision, ¼ precision, ⅛ precision, or the like.

In addition, after the location of the reference pixel in the extension region is determined, if there is no pixel value at the location, an interpolation operation needs to be performed on the reference pixel. For a specific interpolation operation method, DCT interpolation, bilinear interpolation, or another interpolation method may be used.

It should be understood that a difference between the method shown in FIG. 14 and the method shown in FIG. 5 is that, in FIG. 14, the location of the current pixel in the extension region is first calculated, so that the target reference pixel can be more conveniently found during prediction of the current pixel. This omits a calculation process of determining the location of the target reference pixel based on the location of the initial reference pixel. According to the method shown in FIG. 5, during prediction of the pixel value of the current pixel, the location of the target reference pixel is further determined based on the location of the initial reference pixel, and therefore, one more calculation process is required compared with the method shown in FIG. 14. In addition, other steps of the method shown in FIG. 14 are basically the same as other steps of the method shown in FIG. 5. For brevity, repeated descriptions are properly omitted.

Figure 16:
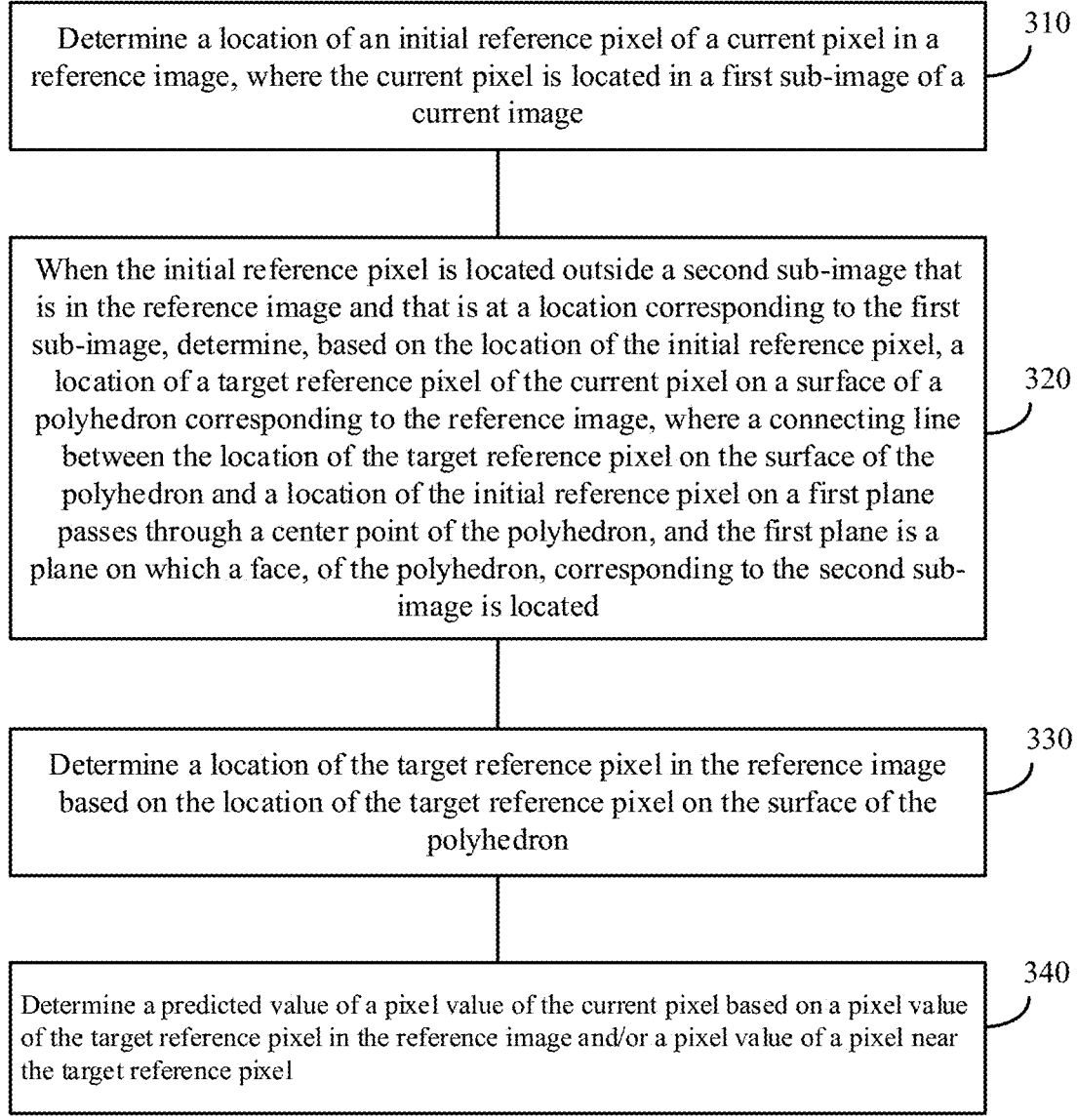
FIG. 16 is a schematic flowchart of a motion compensating prediction method according to an embodiment of the present invention.

FIG. 16 is a schematic flowchart of a motion compensating prediction method according to an embodiment of the present invention. The method shown in FIG. 16 includes the following steps.

310: Determine a location of an initial reference pixel of a current pixel in a reference image, where the current pixel is located in a first sub-image of a current image.

320: When the initial reference pixel is located outside a second sub-image that is in the reference image and that is at a location corresponding to the first sub-image, determine, based on the location of the initial reference pixel, a location of a target reference pixel of the current pixel on a surface of a polyhedron corresponding to the reference image, where a connecting line between the location of the target reference pixel on the surface of the polyhedron and a location of the initial reference pixel on a first plane passes through a center point of the polyhedron, and the first plane is a plane on which a face, of the polyhedron, corresponding to the second sub-image is located.

330: Determine a location of the target reference pixel in the reference image based on the location of the target reference pixel on the surface of the polyhedron.

340: Determine a predicted value of a pixel value of the current pixel based on a pixel value of the target reference pixel in the reference image and/or a pixel value of a pixel near the target reference pixel.

In this embodiment of the present invention, when the initial reference pixel is located outside the second sub-image, the target reference pixel that can actually implement a reference function is found based on the location of the initial reference pixel, and then, the pixel value of the current pixel is predicted based on the target reference pixel. This improves accuracy of motion compensating prediction.

It should be understood that, in this embodiment of the present invention, a difference between the motion compensating prediction method shown in FIG. 5 and the motion compensating prediction method shown in FIG. 16 is that, in FIG. 5, the location of the target reference pixel in the reference image is determined directly based on the location of the initial reference pixel, and in FIG. 16, the location of the target reference pixel on the surface of the polyhedron corresponding to the reference image is first determined based on the location of the initial reference pixel, and then, the location of the target reference pixel in the reference image is determined based on the location of the target reference pixel on the surface of the polyhedron. Explanations and descriptions of the motion compensating prediction method shown in FIG. 5 are also applicable to the motion compensating prediction method shown in FIG. 16. Therefore, for brevity, repeated descriptions are properly omitted herein.

Optionally, in an embodiment, the determining, based on the location of the initial reference pixel, a location of a target reference pixel of the current pixel on a surface of a polyhedron corresponding to the reference image includes: determining the location of the initial reference pixel on the first plane based on the location of the initial reference pixel and layout information of the reference image; and determining the location of the target reference pixel on the surface of the polyhedron based on the location of the initial reference pixel on the first plane and the layout information of the reference image.

Optionally, in an embodiment, the determining a location of the target reference pixel in the reference image based on the location of the target reference pixel on the surface of the polyhedron includes: determining the location of the target reference pixel in the reference image based on the location of the initial reference pixel and the layout information of the reference image, where the location of the target reference pixel on the surface of the polyhedron is at an intersection point of the surface of the polyhedron and a connecting line between the initial reference pixel and the center point of the polyhedron.

It should be understood that the motion compensating prediction method in this embodiment of the present invention is applicable to two-dimensional images in various polyhedron formats. Moreover, the motion compensating prediction method in this embodiment of the present invention is also applicable to cases in which a face of a polyhedron-format two-dimensional image is rotated, a face arrangement sequence is changed, and a spatial layout pattern of faces is changed.

It should be understood that, in this embodiment of the present invention, the pixel value at the location of the target reference pixel may be calculated during prediction of the pixel value of the current pixel. Alternatively, the pixel value of the target reference pixel of the to-be-processed pixel may be pre-calculated. In this way, during processing of the to-be-processed pixel, the pixel value of the target reference pixel of the to-be-processed pixel may be directly obtained, thereby reducing image processing duration.

It should be understood that, although the foregoing uses a hexahedron-format two-dimensional image as an example, this method is also applicable to two-dimensional images in other polyhedron formats, including a tetrahedron format, an octahedron format, and other polyhedron formats.

It should be understood that the foregoing describes in detail the motion compensating prediction method in this embodiment of the present invention by using a 4×3-format two-dimensional image; however, the motion compensating prediction method in this embodiment of the present invention is also applicable to two-dimensional polyhedron images in other pattern formats. The motion compensating prediction method in this embodiment of the present invention is also applicable to cases in which some or all of faces in the two-dimensional image are rotated, a face arrangement sequence is different, a face arrangement method is different, and the like.

It should be understood that, in this embodiment, the pixel value of the reference pixel in the reference image may be directly used as the predicted value of the pixel value of the current pixel, or a pixel value obtained by performing weighting on the pixel value of the reference pixel and the pixel value of the pixel around the reference pixel or a pixel value obtained by performing another operation may be used as the predicted value of the pixel value of the current pixel.

The foregoing describes in detail the motion compensating prediction method in the embodiments of the present invention with reference to FIG. 1 to FIG. 16. The following describes in detail a motion compensating prediction apparatus in the embodiments of the present invention with reference to FIG. 17 to FIG. 22. It should be understood that the motion compensating prediction apparatus in FIG. 17 to FIG. 22 can perform steps of the motion compensating prediction method in FIG. 1 to FIG. 16. To avoid repetition, repeated descriptions are properly omitted.

Figure 17:
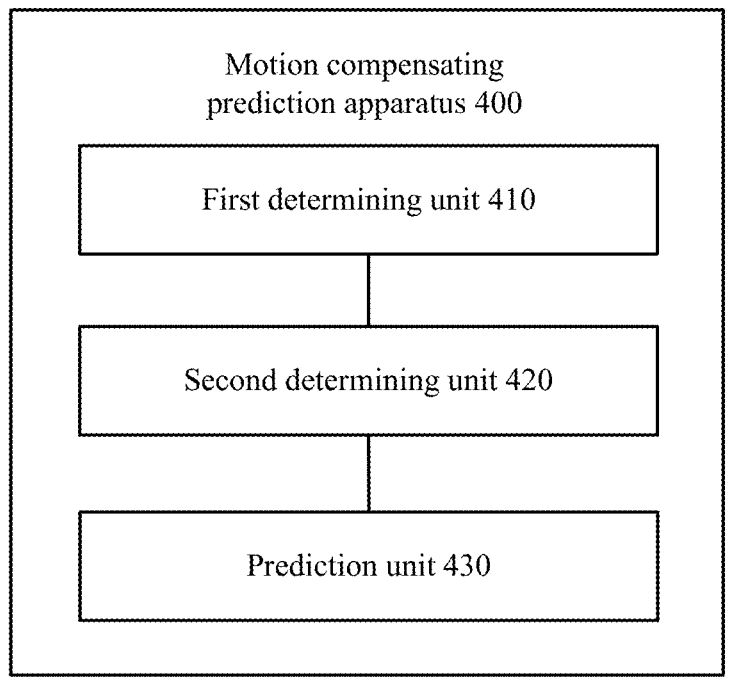
FIG. 17 is a schematic block diagram of a motion compensating prediction apparatus according to an embodiment of the present invention.

FIG. 17 is a schematic block diagram of a motion compensating prediction apparatus according to an embodiment of the present invention. The motion compensating prediction apparatus 400 includes:

a first determining unit 410, configured to determine a location of an initial reference pixel of a current pixel in a reference image, where the current pixel is located in a first sub-image of the current image;

a second determining unit 420, configured to: when the initial reference pixel is located outside a second sub-image that is in the reference image and that is at a location corresponding to the first sub-image, determine a location of a target reference pixel of the current pixel in the reference image based on the location of the initial reference pixel, where a connecting line between a location of the target reference pixel on a surface of a polyhedron corresponding to the reference image and a location of the initial reference pixel on a first plane passes through a center point of the polyhedron, the location of the target reference pixel on the surface of the polyhedron is determined based on the location of the initial reference pixel and layout information of the polyhedron corresponding to the reference image, and the first plane is a plane on which a face, of the polyhedron, corresponding to the second sub-image is located; and a prediction unit 430, configured to determine a predicted value of a pixel value of the current pixel based on a pixel value of the target reference pixel and/or a pixel value of a pixel near the target reference pixel.

In this embodiment of the present invention, when the initial reference pixel is located outside the second sub-image, prediction for the current pixel directly based on the initial reference pixel is inaccurate due to impact of geometrical deformation of a sub-image boundary of a two-dimensional image. Therefore, in this case, according to some embodiments of the present invention, the target reference pixel that can actually implement a reference function is found based on the location of the initial reference pixel, and then, the pixel value of the current pixel is predicted based on the target reference pixel. This improves accuracy of motion compensating prediction.

Optionally, in an embodiment, the motion compensating prediction apparatus 400 further includes:

a judging unit 440, configured to determine, based on layout information of the reference image and the location of the initial reference pixel, whether the initial reference pixel is located outside the second sub-image in the reference image.

Optionally, in an embodiment, the second determining unit 420 is specifically configured to:

determine the location of the target reference pixel on the surface of the polyhedron based on the location of the initial reference pixel and the layout information of the reference image, where the location of the target reference pixel on the surface of the polyhedron is at an intersection point of the surface of the polyhedron and a connecting line between the initial reference pixel and the center point of the polyhedron; and determine the location of the target reference pixel in the reference image based on the location of the target reference pixel on the surface of the polyhedron and the layout information of the reference image.

Optionally, in an embodiment, the second determining unit 420 is specifically configured to:

determine the location of the initial reference pixel on the first plane based on the location of the initial reference pixel and the layout information of the reference image; and determine the location of the target reference pixel on the surface of the polyhedron based on the location of the initial reference pixel on the first plane and the layout information of the reference image.

Optionally, in an embodiment, the layout information includes at least one of face quantity information of the polyhedron, sub-image arrangement manner information of the reference image, sub-image arrangement sequence information of the reference image, and sub-image rotation information of the reference image.

Optionally, in an embodiment, the prediction unit 430 is specifically configured to:

determine the pixel value of the target reference pixel as the predicted value of the pixel value of the current pixel.

Optionally, in an embodiment, the prediction unit 430 is specifically configured to:

perform weighted processing on the pixel value of the target reference pixel and the pixel value of the pixel near the target reference pixel; and determine a pixel value that is obtained through the weighted processing and that is at the location of the target reference pixel, as the predicted value of the pixel value of the current pixel.

Optionally, in an embodiment, the prediction unit 430 is specifically configured to:

perform an interpolation operation at the location of the target reference pixel based on the pixel value of the pixel near the target reference pixel; and determine a pixel value obtained through the interpolation operation, as the predicted value of the pixel value of the current pixel.

Figure 18:
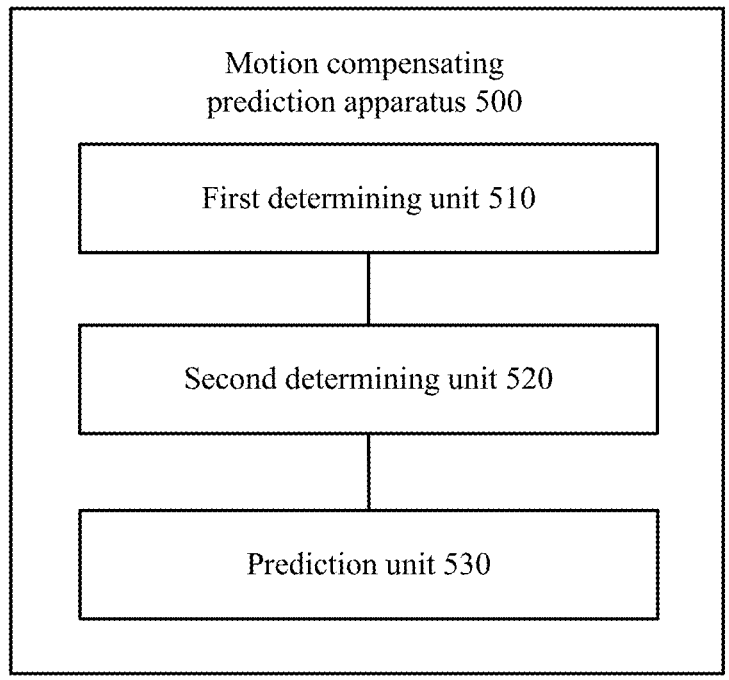
FIG. 18 is a schematic block diagram of a motion compensating prediction apparatus according to an embodiment of the present invention.

FIG. 18 is a schematic block diagram of a motion compensating prediction apparatus according to an embodiment of the present invention. The motion compensating prediction apparatus 500 includes:

a first determining unit 510, configured to determine a location of an initial reference pixel of a current pixel in a reference image, where the current pixel is located in a first sub-image of the current image;

a second determining unit 520, configured to: when the initial reference pixel is located outside a second sub-image that is in the reference image and that is at a location corresponding to the first sub-image, determine a location of a target reference pixel of the current pixel in an extension region of the second sub-image, where the extension region of the second sub-image is located outside the second sub-image, the extension region includes a plurality of pixels, a pixel value of any first pixel in the extension region is determined based on a pixel value of a second pixel in the reference image, a connecting line between a location of the second pixel on a surface of a polyhedron formed by the reference image and a location of the first pixel on a first plane passes through a center point of the polyhedron, the location of the second pixel on the surface of the polyhedron is determined based on the location of the first pixel and layout information of the polyhedron corresponding to the reference image, and the first plane is a plane on which a face, of the polyhedron, corresponding to the second sub-image is located; and a prediction unit 530, configured to determine a predicted value of a pixel value of the current pixel based on a pixel value of the target reference pixel and/or a pixel value of a pixel near the target reference pixel.

In this embodiment of the present invention, when the initial reference pixel is located outside the second sub-image, prediction for the current pixel directly based on the initial reference pixel is inaccurate due to impact of geometrical deformation of a sub-image boundary of a two-dimensional image. Therefore, in this case, according to some embodiments of the present invention, the target reference pixel that can actually implement a reference function is searched for directly in the extension region based on the current pixel and motion information of the current pixel, and then, the pixel value of the current pixel is predicted based on the target reference pixel. In this way, the target reference pixel can be quickly found, and further, accuracy of motion compensating prediction can be improved.

Optionally, in an embodiment, the motion compensating prediction apparatus further includes:

a third determining unit 540, where the third determining unit 540 is specifically configured to:

determine the location of the second pixel on the surface of the polyhedron based on the location of the first pixel and layout information of the reference image, where the location of the second pixel on the surface of the polyhedron is at an intersection point of the surface of the polyhedron and a connecting line between the first pixel and the center point of the polyhedron; and determine a location of the second pixel in the reference image based on the location of the second pixel on the surface of the polyhedron and the layout information of the reference image.

Optionally, in an embodiment, the motion compensating prediction apparatus further includes:

a judging unit 550, configured to determine, based on the layout information of the reference image and the location of the initial reference pixel, whether the initial reference pixel is located outside the second sub-image in the reference image.

Figure 19:
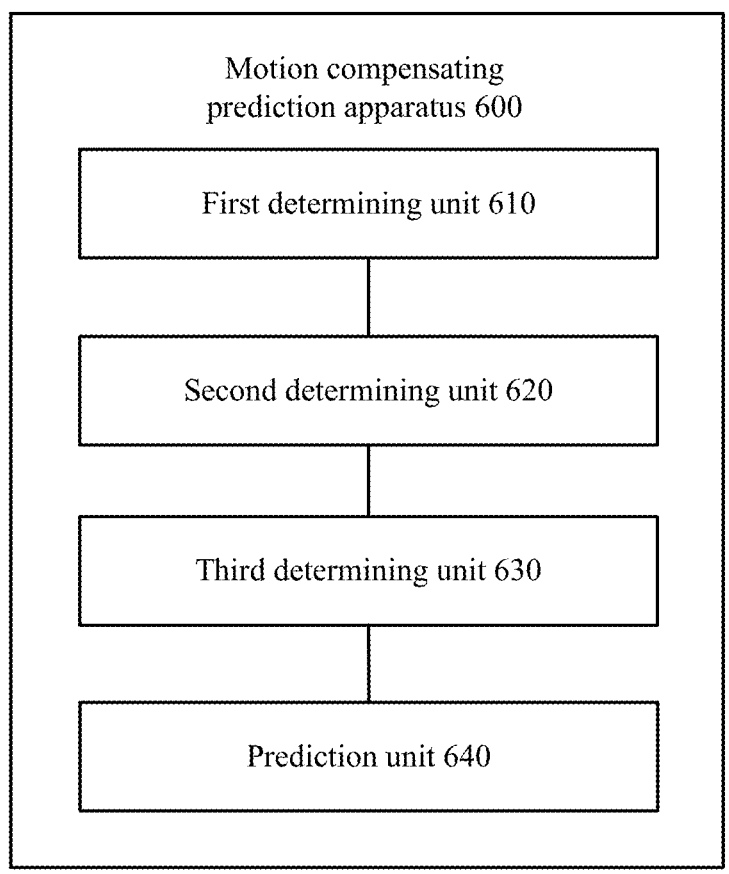
FIG. 19 is a schematic block diagram of a motion compensating prediction apparatus according to an embodiment of the present invention.

FIG. 19 is a schematic block diagram of a motion compensating prediction apparatus according to an embodiment of the present invention. The motion compensating prediction apparatus 600 includes:

a first determining unit 610, configured to determine a location of an initial reference pixel of a current pixel in a reference image, where the current pixel is located in a first sub-image of the current image;

a second determining unit 620, configured to: when the initial reference pixel is located outside a second sub-image that is in the reference image and that is at a location corresponding to the first sub-image, determine, based on the location of the initial reference pixel, a location of a target reference pixel of the current pixel on a surface of a polyhedron corresponding to the reference image, where a connecting line between the location of the target reference pixel on the surface of the polyhedron and a location of the initial reference pixel on a first plane passes through a center point of the polyhedron, and the first plane is a plane on which a face, of the polyhedron, corresponding to the second sub-image is located;

a third determining unit 630, configured to determine a location of the target reference pixel in the reference image based on the location of the target reference pixel on the surface of the polyhedron; and a prediction unit 640, configured to determine a predicted value of a pixel value of the current pixel based on a pixel value of the target reference pixel in the reference image and/or a pixel value of a pixel near the target reference pixel.

In this embodiment of the present invention, when the initial reference pixel is located outside the second sub-image, prediction for the current pixel directly based on the initial reference pixel is inaccurate due to impact of geometrical deformation of a sub-image boundary of a two-dimensional image. Therefore, in this case, according to some embodiments of the present invention, the target reference pixel that can actually implement a reference function is found based on the location of the initial reference pixel, and then, the pixel value of the current pixel is predicted based on the target reference pixel. This improves accuracy of motion compensating prediction.

Optionally, in an embodiment, the second determining unit 620 is specifically configured to:

determine the location of the initial reference pixel on the first plane based on the location of the initial reference pixel and layout information of the reference image; and determine the location of the target reference pixel on the surface of the polyhedron based on the location of the initial reference pixel on the first plane and the layout information of the reference image.

Optionally, in an embodiment, the third determining unit is specifically configured to:

determine the location of the target reference pixel in the reference image based on the location of the initial reference pixel and the layout information of the reference image, where the location of the target reference pixel on the surface of the polyhedron is at an intersection point of the surface of the polyhedron and a connecting line between the initial reference pixel and the center point of the polyhedron.

The foregoing describes in detail the motion compensating prediction method and the motion compensating prediction apparatus in the embodiments of the present invention with reference to FIG. 1 to FIG. 19. Actually, the motion compensating prediction method in the embodiments of the present invention may be considered as an intermediate process or step in an encoding process or a decoding process. A panoramic video encoder or a panoramic video decoder can implement the motion compensating prediction method in the embodiments of the present invention. The following describes in detail a decoding process of a panoramic video decoder and an encoding process of a panoramic video encoder with reference to FIG. 20 and FIG. 21, respectively.

Before the decoding process of the panoramic video decoder is described with reference to FIG. 20, some mechanisms used for image encoding by the encoder and image decoding by the decoder are first described briefly.

Before encoding of a current image, the current image is usually divided into blocks with equal sizes, and then, an encoding operation is performed on each block. In a process of encoding the current image, layout information of the current image is usually transmitted as header information to a decoder side. The header information is preamble information. After receiving an encoded code stream, the decoder first decodes the header information, and then decodes a subsequent code stream based on the header information. It is assumed that, during encoding, the current image is divided into a plurality of image blocks to be sequentially encoded, and during decoding, decoding is performed in a same sequence. For a current block, if an interframe coding scheme is determined for the current block, a reconstruction value of a pixel value of a pixel in the current block needs to be obtained to obtain reconstruction information of the current block.

Figure 20:
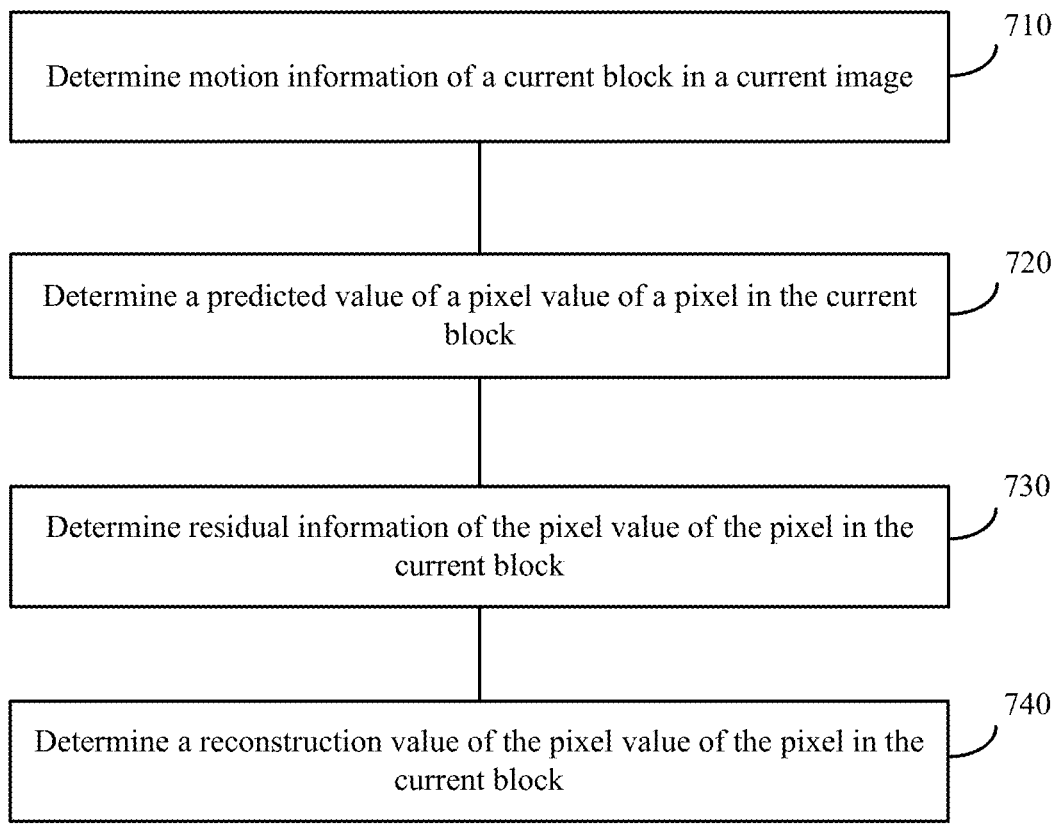
FIG. 20 is a schematic flowchart of a decoding process of a panoramic video decoder.

FIG. 20 is a schematic flowchart of a decoding process of a panoramic video decoder. The process specifically includes the following steps.

710: Determine motion information of a current block in a current image.

Specifically, the decoder may decode a motion information code stream, and determine the motion information of the current block based on a decoding result.

It should be understood that, in step 710, the motion information of the current block may be alternatively determined by decoding indication information of predicted motion information and information about a difference between the predicted motion information and the motion information. In other words, the motion information of the current block may be determined without directly parsing an encoded code stream of the motion information. For example, a decoder side may construct a motion information set (for example, the motion information set includes motion information of a reconstructed block that neighbors the current block in time or space, and a construction method of the set is agreed upon by an encoder side and the decoder side together). In this case, the decoder side may parse the indication information of the predicted motion information, then determine the predicted motion information from the set, and obtain the motion information of the current block based on the predicted motion information and the information about the difference between the predicted motion information and the motion information. In addition, it should be understood that the decoder side alternatively uses the predicted motion information determined based on the indication information of the predicted motion information, as the motion information of the current block. A specific method to be used is agreed upon by the encoder side and the decoder side. Alternatively, the encoder side transmits information about a used manner to the decoder side, and the decoder side determines, based on the received manner information, the manner for determining the motion information of the current block.

In addition, in step 710, one set of motion information needs to be parsed in a case of unidirectional reference, or two sets of motion information need to be parsed in a case of bidirectional reference. A specific quantity of sets of motion information to be parsed is agreed upon by the encoder side and the decoder side together. Alternatively, the encoder side transmits information about a used quantity of sets to the decoder side, and the decoder side determines the quantity based on a parsing result.

720: Determine a predicted value of a pixel value of a pixel in the current block.

The decoder may determine, based on the motion information of the current block, a reference image of the current image in which the current block is located, and determine a location of a reference block in the reference image. Actually, determining the predicted value of the pixel value of the pixel in the current block is determining a predicted value of a pixel value of each pixel in the current block. The predicted value of the pixel value of the pixel may be specifically determined according to the motion compensating prediction method in the embodiments of the present invention.

It should be understood that, after the predicted value of the pixel value of each pixel in the current block is obtained, a prediction block of the current block may be obtained based on the predicted value of the pixel value of each pixel. The prediction block includes the predicted values of the pixel values of all the pixels in the current block.

In step 720, in the case of unidirectional reference, a location of only one reference block in the reference image needs to be determined, and a location of only one reference pixel needs to be determined for one pixel in the current block; then, the predicted value of the pixel value of the pixel in the current block may be determined according to the motion compensating prediction method in the embodiments of the present invention.

In the case of bidirectional reference, locations of two reference blocks of the current block in respective reference images need to be determined, and locations of two reference pixels in the two reference blocks need to be determined for one pixel in the current block. Then, two predicted values of the pixel value of the pixel in the current block may be determined according to the motion compensating prediction method in the embodiments of the present invention. Then, weighting or another operation is performed on the two predicted values, to obtain the predicted value of the pixel value of the pixel in the current block. A specific operation manner is agreed upon by the encoder side and the decoder side together. Alternatively, the encoder side transmits a used method to the decoder side, and the decoder side determines the used method based on a parsing result.

In addition, after the predicted value of the pixel value of the pixel in the current block is obtained, another operation may be first performed on the predicted value, and a predicted value obtained through the operation is used as a final predicted value of the pixel value of the current pixel. For example, a predicted value obtained by performing smooth filtering on the obtained predicted value may be used as the final predicted value of the pixel value of the current pixel. Specifically whether to perform the another operation and which manner is to be used are agreed upon by the encoder side and the decoder side together. Alternatively, the encoder side transmits a used method to the decoder side, and the decoder side determines the used method based on a parsing result. In addition, bidirectional prediction may be alternatively performed on the pixel value of the current pixel. To be specific, prediction may be performed on the current pixel for two times, and then, weighting is performed on two obtained predicted values to obtain the predicted value of the pixel value of the current pixel.

730: Determine residual information of the pixel value of the pixel in the current block.

The decoder decodes an encoded code stream of the residual information of the pixel value of the pixel in the current block, and obtains the residual information of the pixel value of the pixel in the current block by using a dequantization method and an inverse transformation method. In other words, the decoder decodes an encoded code stream of a residual block of the current block, and then obtains the residual block of the current block by using the dequantization method and the inverse transformation method.

It should be understood that, in step 730, only the dequantization method or only the inverse transformation method may be alternatively used, to determine the residual information of the pixel value of the pixel in the current block. A specific method to be used is agreed upon by the encoder side and the decoder side together. Alternatively, the encoder side transmits a used method to the decoder side, and the decoder side determines the used method based on a parsing result.

740: Determine a reconstruction value of the pixel value of the pixel in the current block.

A reconstruction value of a pixel value of each pixel in the current block may be obtained based on the predicted pixel value, of the pixel in the current block, obtained in step 720 and the residual information, of the pixel value of the pixel in the current block, obtained in step 730. In addition, alternatively, the prediction block of the current block may be obtained according to step 720, and then, a reconstruction block of the current block may be obtained by adding the prediction block and the residual block that is obtained in step 730. The reconstruction block includes the reconstruction value of the pixel value of each pixel in the current block.

It should be understood that, in step 740, in order to obtain the reconstruction value of the pixel value of the pixel in the current block, some other operations such as deblocking filtering may also need to be performed after predicted information and the residual information are added. Specifically whether the other operations need to be performed and which type of operation is to be performed are agreed upon by the encoder side and the decoder side together. Alternatively, the encoder side transmits a used method to the decoder side, and the decoder side determines the used method based on a parsing result.

The foregoing describes in detail the decoding process of the panoramic video decoder with reference to FIG. 20. Actually, the decoding process is usually performed on an encoded code stream obtained through encoding. The following describes in detail an encoding process with reference to FIG. 21 by using a panoramic video encoder as an example.

Usually, layout information of a spherical image may be determined after the spherical image is collected or generated. Therefore, before the encoder encodes panoramic video, the encoder already knows the layout information of the spherical image. The layout information of the spherical image is usually transmitted as header information. The header information is preamble information. In this case, before receiving an encoded code stream, a decoder first decodes the header information, and may decode a subsequent code stream after obtaining the layout information of the spherical image based on the header information.

Figure 21:
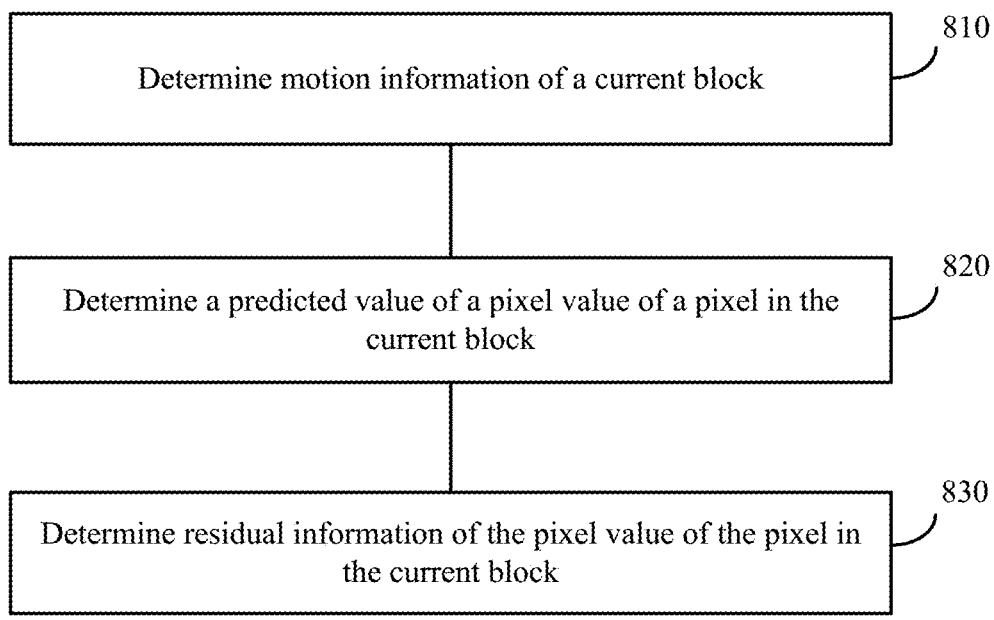
FIG. 21 is a schematic flowchart of an encoding process of a panoramic video encoder.

FIG. 21 is a schematic flowchart of an encoding process of a panoramic video encoder. The process specifically includes the following steps.

810: Determine motion information of a current block.

The encoder first determines the motion information of the current block, and then encodes the motion information. Specifically, the encoder selects a reference image for a current image in a reconstructed image, searches for a match block for the current block in a specified region of the reference image, uses the match block as a reference block of the current block, uses, as the motion information, the reference image and motion vector indicating the offset between the reference block and the location corresponding to the current block in the reference image, used in the processes above, and encodes the motion vector information.

When searching for the reference block for the current block in the specified region of the reference image, the encoder may first select a plurality of blocks for the current block, and a block finally selected as the reference block may be determined by using a rate-distortion optimization rule. For example, a quantity of bits of the motion information that needs to be encoded when a candidate reference block is used as the match block is determined, a distortion value when a pixel value of a pixel in the current block is predicted by using a pixel value of a pixel in a current candidate reference block is determined, and costs of the candidate reference block are determined by using a Lagrange optimization method. Then, a candidate reference block with minimum costs is selected as the match block. When there are a plurality of reference images, the foregoing operation needs to be performed on each image.

It should be understood that, in step 810, the motion information may not be directly encoded; instead, indication information of predicted motion information or information about a difference between predicted motion information and the motion information is encoded. For example, an encoder side may construct a motion information set (for example, the motion information set includes motion information of a reconstructed block that neighbors the current block in time or space, and a construction method of the set is agreed upon by the encoder side and a decoder side together). In this case, the encoder side may select one piece of motion information from the set as the predicted motion information, then obtain the information about the difference between the motion information of the current block and the predicted motion information, and encode the indication information of the predicted motion information and the difference information. Alternatively, only the indication information of the predicted motion information may be encoded, so that the decoder side can determine the motion information from the constructed motion information set based on the indication information, and uses the motion information as the motion information of the current block. A specific method to be used is agreed upon by the encoder side and the decoder side together. Alternatively, a method may be selected by using a rate-distortion method, and the selected method is transmitted to the decoder side.

In step 810, only one set of motion information needs to be encoded in a case of unidirectional reference, or two sets of motion information need to be encoded in a case of bidirectional reference. A specific quantity of sets of motion information to be encoded is agreed upon by the encoder side and the decoder side together. Alternatively, the quantity may be determined by using a rate-distortion method, and the encoder side transmits corresponding information to the decoder side.

In the case of unidirectional reference, a location of one reference block in the reference image needs to be determined, and a location of one reference pixel needs to be determined for one current pixel in the current block; then, a predicted value of a pixel value of the reference pixel is determined according to the motion compensating prediction method in the embodiments of the present invention. In the case of bidirectional reference, locations of two reference blocks of the current block in respective reference images need to be determined. To be specific, locations of two reference pixels in the two reference blocks need to be determined for one pixel in the current block. Then, two predicted values of the pixel value of the pixel in the current block may be determined according to the motion compensating prediction method in the embodiments of the present invention. Then, weighting or another operation is performed on the two predicted values, to obtain the predicted value of the pixel value of the pixel in the current block. A specific operation manner is agreed upon by the encoder side and the decoder side together. Alternatively, the encoder side transmits a used method to the decoder side, and the decoder side determines the used method based on a parsing result.

820: Determine a predicted value of a pixel value of a pixel in the current block.

The encoder may determine, based on the motion information of the current block, the reference image of the current image in which the current block is located, and determine the location of the reference block in the reference image. Actually, determining the predicted value of the pixel value of the pixel in the current block is determining a predicted value of a pixel value of each pixel in the current block. The predicted value of the pixel value of the pixel may be specifically determined according to the motion compensating prediction method in the embodiments of the present invention.

In addition, after the predicted value of the pixel value of the pixel in the current block is obtained, another operation may be first performed on the predicted value, and a predicted value obtained through the operation is used as a final predicted value of the pixel value of the current pixel. For example, a predicted value obtained by performing smooth filtering on the obtained predicted value may be used as the final predicted value of the pixel value of the current pixel. Specifically whether to perform the another operation and which manner is to be used are agreed upon by the encoder side and the decoder side together. Alternatively, the encoder side transmits a used method to the decoder side, and the decoder side determines the used method based on a parsing result. In addition, bidirectional prediction may be alternatively performed on the pixel value of the current pixel. To be specific, prediction may be performed on the current pixel for two times, and then, weighting is performed on two obtained predicted values to obtain the predicted value of the pixel value of the current pixel.

830: Determine residual information of the pixel value of the pixel in the current block.

The encoder subtracts the predicted value from the pixel value of the pixel in the current block, to obtain the residual information of the pixel value of the pixel in the current block, then processes the residual information of the pixel value of the pixel in the current block according to a transformation method and a quantization method, and encodes a result obtained after the processing.

It should be understood that, only the transformation method or only the quantization method may be alternatively used during encoding of the residual information of the pixel value of the pixel in the current block. A specific method to be used is agreed upon by the encoder side and the decoder side together. Alternatively, the encoder side may determine a method by using a rate-distortion method, and transmit information to the decoder side.

Figure 22:
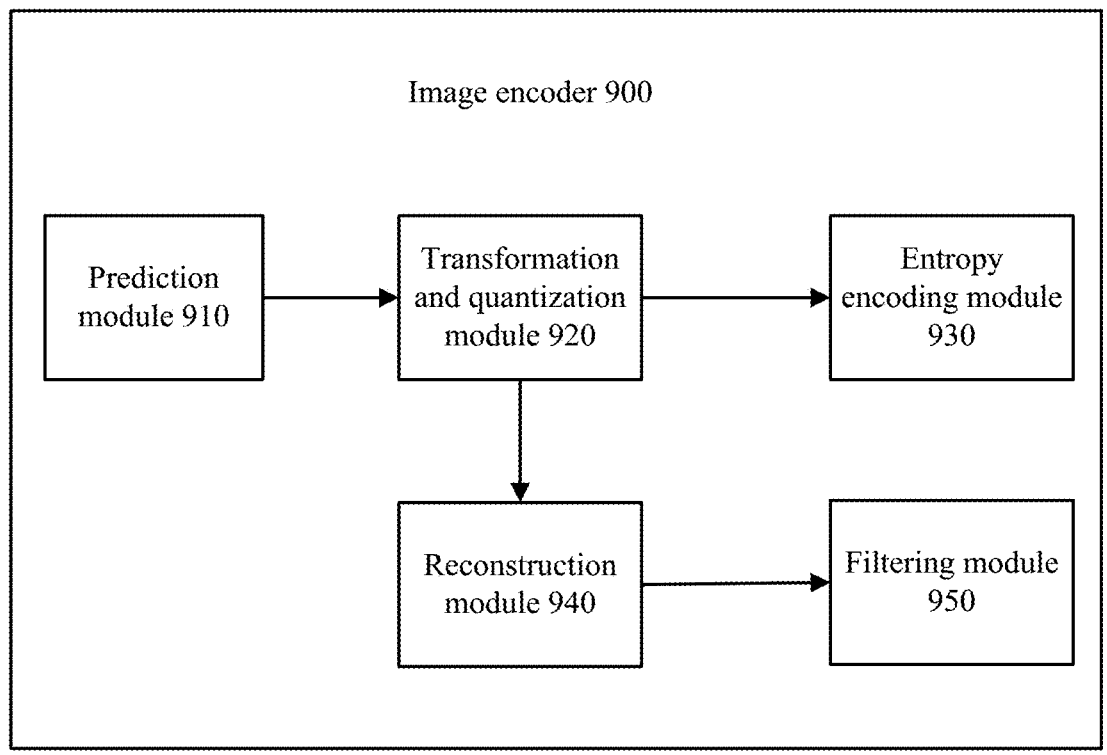
FIG. 22 is a schematic block diagram of an image encoder according to an embodiment of the present invention.

FIG. 22 is a schematic block diagram of an image encoder 900 according to an embodiment of the present invention. The image encoder 900 includes a prediction module 910, a transformation and quantization module 920, an entropy encoding module 930, a reconstruction module 940, and a filtering module 950. A specific function of each module is as follows.

The prediction module 910 is configured to generate prediction data. The prediction module 910 may generate one or more prediction units (PU) of each CU that is not segmented any longer. Each PU of the CU may be associated with different pixel blocks in a pixel block of the CU. The prediction module 910 may generate a predicative pixel block for each PU of the CU. The prediction module 910 may generate the predicative pixel block for the PU through intra-frame prediction or inter prediction. If the prediction module 910 generates the predictive pixel block for the PU through intra-frame prediction, the prediction module 910 may generate the predictive pixel block for the PU based on a pixel obtained through decoding of a picture associated with the PU. If the prediction module 910 generates the predictive pixel block for the PU through inter prediction, the prediction module 910 may generate the predictive pixel block for the PU based on a pixel obtained through decoding of one or more pictures different from a picture associated with the PU. The prediction module 910 may generate a residual pixel block for the CU based on the predicative pixel block for the PU of the CU. The residual pixel block for the CU may indicate a difference between a sampling value in the predicative pixel block for the PU of the CU and a corresponding sampling value in an initial pixel block for the CU.

The transformation and quantization module 920 is configured to process residual data obtained through prediction. The image encoder 900 may perform recursive quadtree segmentation on the residual pixel block for the CU, to segment the residual pixel block for the CU into one or more smaller residual pixel blocks associated with a transformation unit (TU) of the CU. Each pixel in a pixel block associated with the TU is corresponding to one luminance sample and two chrominance samples. Therefore, each TU may be associated with one residual sampling block of luminance and two residual sampling blocks of chrominance. The image encoder 900 may apply one or more transformations to the residual sampling block associated with the TU, to generate a coefficient block (in other words, a block of a coefficient). The transformation may be DCT transformation or a variant thereof. The coefficient block is obtained by calculating two-dimensional transformation by applying one-dimensional transformation in horizontal and vertical directions, and by using a DCT transformation matrix. The image encoder 900 may execute a quantization program on each coefficient in the coefficient block. Quantization usually means quantizing the coefficient to reduce an amount of data used to represent the coefficient, thereby providing a process of further compression.

The image encoder 900 may generate a set used to represent syntactic elements of a coefficient in a coefficient block obtained through quantization. The image encoder 900 may apply an entropy encoding operation (for example, a context-adaptive binary arithmetic coding (CABAC) operation) to some or all of the syntactic elements by using the entropy encoding module 930. To apply CABAC encoding to the syntactic element, the entropy encoding module 930 may binarize the syntactic element to form a binary sequence including one or more bits (referred to as "binary bits"). The entropy encoding module 930 may encode some of the binary bits through regular encoding, and may encode the other part of the binary bits through bypass encoding.

In addition to performing entropy encoding on the syntactic element of the coefficient block, the image encoder 900 may apply, by using the reconstruction module 940, dequantization and inverse transformation to a coefficient block obtained through transformation, to reconstruct a residual sampling block from the coefficient block obtained through transformation. The image encoder 900 may add the reconstructed residual sampling block to a sampling block corresponding to one or more predicative sampling blocks, to generate a reconstructed sampling block. By reconstructing a sampling block of each color component, the image encoder 900 may reconstruct a pixel block associated with the TU. A pixel block for each TU of the CU is reconstructed in this manner, until an entire pixel block for the CU is reconstructed.

After the image encoder 900 reconstructs the pixel block for the CU, the image encoder 900 performs a deblocking filtering operation by using the filtering module 950, to reduce a blocking artifact of the pixel block associated with the CU. After the image encoder 900 performs the deblocking filtering operation, the image encoder 900 may modify a reconstructed pixel block of a CTB of a picture through sample-adaptive offset (SAO). After performing these operations, the image encoder 900 may store the reconstructed pixel block for the CU in a decoded picture buffer, to generate a predicative pixel block for another CU.

In one or more embodiments, the described function may be implemented by using hardware, software, firmware, or any combination thereof. If the function is implemented by using software, the function may be stored in a computer readable medium as one or more instructions or code or be sent by using a computer readable medium, and be performed by using a hardware-based processing unit. The computer readable medium may include a computer readable storage medium (which is corresponding to a tangible medium such as a data storage medium) or a communications medium, and the communications medium includes (for example) any medium that promotes, according to a communications protocol, transfer of a computer program from a place to another place. In this manner, the computer readable medium may be generally corresponding to (1) a non-transitory tangible computer readable storage medium or (2) a communications medium such as a signal or a carrier. The data storage medium may be any available medium that can be accessed by one or more computers or one or more processors to retrieve an instruction, code, and/or a data structure for implementing a technology described in the present disclosure. A computer program product may include the computer readable medium.

As an example rather than a limitation, some computer readable storage media may include a RAM, a ROM, an EEPROM, a CD-ROM or another optical disc storage, a magnetic disk storage or another magnetic storage apparatus, a flash memory, or any other medium that can store required program code in a form of an instruction or a data structure and that can be accessed by a computer. In addition, any connection may be appropriately referred to as a computer readable medium. For example, if an instruction is sent from a website, a server, or another remote source by using a coaxial cable, an optical cable, a twisted pair, a digital subscriber line (DSL), or a wireless technology (for example, infrared, radio, or microwave), the coaxial cable, the optical cable, the twisted pair, the DSL, or the wireless technology (for example, infrared, radio, or microwave) is included in a definition of a medium. However, it should be understood that the computer readable storage medium and the data storage medium do not include a connection, a carrier, a signal, or another transitory medium, but are non-transitory tangible storage media. A magnetic disk and an optical disc used in this specification include a compact disc (CD), a laser disc, an optical disc, a digital versatile disc (DVD), a floppy disk, and a Blu-ray disc. The magnetic disk usually copies data magnetically, and the optical disc copies data optically by using a laser. A combination of the foregoing objects shall be further included in a scope of the computer readable medium.

An instruction may be executed by one or more processors such as one or more digital signal processors (DSP), one or more general microprocessors, one or more application-specific integrated circuits (ASIC), one or more field programmable gate arrays (FPGA), or one or more other equivalent integrated circuits or discrete logic circuits. Therefore, the term "processor" used in this specification may refer to any one of the foregoing structures or any other structure that is applicable to implementation of the technology described in this specification. In addition, in some aspects, the function described in this specification may be provided in a dedicated hardware and/or software module configured for encoding and decoding, or may be incorporated into a combined codec. In addition, the technology may be implemented in one or more circuits or logic elements.

The technology in embodiments of the present invention may be widely implemented by a plurality of apparatuses or devices. The apparatuses or devices include a radio handset, an integrated circuit (IC), or an IC set (for example, a chip set). In the present disclosure, various components, modules, or units are described to emphasize a function aspect of an apparatus that is configured to implement the disclosed technology, but functions do not necessarily need to be implemented by using different hardware units. Precisely, as described above, various units may be combined into a codec hardware unit, or may be provided by a collection of interoperable hardware units (including one or more processors described above) in combination with proper software and/or firmware.

It should be understood that "an implementation" or "one implementation" mentioned in the whole specification means that particular features, structures, or characteristics related to the implementation are included in at least one implementation of embodiments of the present invention. Therefore, "in an implementation" or "in one implementation" appearing throughout this specification may not be a same implementation. In addition, these particular features, structures, or characteristics may be combined in one or more implementations in any proper manner.

It should be understood that, in various implementations of embodiments of the present invention, sequence numbers of the foregoing processes do not mean execution sequences. The execution sequences of the processes should be determined based on functions and internal logic of the processes, but should not constitute any limitation on an implementation process of the implementations of embodiments of the present invention.

In addition, usually, the terms "system" and "network" may be used interchangeably in this specification. It should be understood that the term "and/or" in this specification is merely an associative relationship for describing associated objects, and indicates that three relationships may exist. For example, A and/or B may represent the following three cases: Only A exists, both A and B exist, and only B exists. In addition, the character "/" in this specification usually indicates an "or" relationship between former and latter associated objects.

It should be understood that, in the implementations of this application, "B corresponding to A" indicates that B is associated with A, and B may be determined based on A. However, it should be further understood that determining B based on A does not mean that B is determined based on only A, that is, B may also be determined based on A and/or other information.

A person of ordinary skill in the art may be aware that units and algorithm steps in the examples described with reference to the implementations disclosed in this specification may be implemented by electronic hardware, computer software, or a combination thereof. To clearly describe interchangeability between the hardware and the software, the foregoing generally describes composition and steps of each example based on functions. Whether the functions are performed by hardware or software depends on specific applications and design constraints of the technical solutions. A person skilled in the art may use different methods to implement the described functions for each specific application, but it should not be considered that such an implementation goes beyond the scope of the present disclosure.

It can be clearly understood by a person skilled in the art that, for ease and brevity of description, for detailed working processes of the foregoing systems, apparatuses, and units, reference may be made to corresponding processes in the foregoing method embodiments, and details are not described herein again.

In the several embodiments provided in this application, it should be understood that the disclosed systems, apparatuses, and methods may be implemented in other manners. For example, the described apparatus embodiment is merely an example. For example, the unit division is merely logical function division and may be other division in actual implementation. For example, a plurality of units or components may be combined or may be integrated into another system, or some features may be ignored or not performed. In addition, the displayed or discussed mutual couplings, direct couplings, or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected depending on an actual requirement, to achieve the objectives of the solutions in the embodiments.

In addition, functional units in the embodiments of the present invention may be integrated into one processing unit, or each of the units may exist alone physically, or two or more units may be integrated into one unit.

When the functions are implemented in a form of a software function unit, and are sold or used as an independent product, the functions may be stored in a computer readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present invention. The foregoing storage medium includes various media that can store program code, such as a USB flash drive, a removable hard disk, a read-only memory (ROM), a random access memory (RAM), a magnetic disk, and an optical disc.

The foregoing descriptions are merely specific embodiments of the present invention, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A motion compensating prediction method, comprising:
    determining a location of an initial reference pixel in a reference image, the initial reference pixel corresponding to a current pixel located in a first sub-image of a current image, wherein both the reference image and the current image are comprised of one or more sub-images;
    when the location of the initial reference pixel is outside of a second sub-image of the reference image but is corresponding to the first sub-image of the current image,
        determining a location of a target reference pixel in the reference image based on the location of the initial reference pixel, wherein
            the target reference pixel corresponds to the current pixel,
            a connecting line between a location of the target reference pixel on a surface of a polyhedron corresponding to the reference image and a location of the initial reference pixel on a first plane passes through a center point of the polyhedron,
            the location of the target reference pixel on the surface of the polyhedron is determined based on the location of the initial reference pixel and layout information of the polyhedron corresponding to the reference image, and
            the first plane is a plane on which a face, of the polyhedron, corresponding to the second sub-image is located,
        wherein the polyhedron corresponding to the reference image is disposed on the reference image and an anchor face of the polyhedron is a face on which a region of the second sub-image in the reference image is located,
    wherein the anchor face is also a face used as a reference when the polyhedron is unfolded; and
    predicting a pixel value of the current pixel based on a pixel value of the target reference pixel by:
        obtaining a weighted pixel value by performing weighted processing on the pixel value of the target reference pixel and a pixel value of a pixel near the target reference pixel; and
        determining that the weighted pixel value at the location of the target reference pixel is the predicted pixel value of the current pixel.

2. The method according to claim 1, further comprising:
    determining, based on layout information of the reference image and the location of the initial reference pixel, whether the initial reference pixel is located outside the second sub-image of the reference image.

3. The method according to claim 1, wherein determining the location of the target reference pixel in the reference image based on the location of the initial reference pixel comprises:
  determining the location of the target reference pixel on the surface of the polyhedron based on the location of the initial reference pixel and the layout information of the reference image, wherein the location of the target reference pixel on the surface of the polyhedron is at an intersection point of the surface of the polyhedron and a connecting line between the initial reference pixel and the center point of the polyhedron; and
  determining the location of the target reference pixel in the reference image based on the location of the target reference pixel on the surface of the polyhedron and the layout information of the reference image.

4. The method according to claim 3, wherein determining the location of the target reference pixel on the surface of the polyhedron based on the location of the initial reference pixel and the layout information of the reference image comprises:
  determining the location of the initial reference pixel on the first plane based on the location of the initial reference pixel and the layout information of the reference image; and
  determining the location of the target reference pixel on the surface of the polyhedron based on the location of the initial reference pixel on the first plane and the layout information of the reference image.

5. The method according to claim 1, wherein the layout information comprises one or more selected from the group consisting of:
  face quantity information of the polyhedron, sub-image arrangement manner information of the reference image, sub-image arrangement sequence information of the reference image, and sub-image rotation information of the reference image.

6. A motion compensating prediction method, comprising:
  determining a location of an initial reference pixel in a reference image, the initial reference pixel corresponding to a current pixel located in a first sub-image of a current image, wherein both the reference image and the current image are comprised of one or more sub-images;
  when the location of the initial reference pixel is outside of a second sub-image of the reference image but is corresponding to the first sub-image of the current image,
    determining a location of a target reference pixel in an extension region of the second sub-image, located outside the second sub-image, wherein
      the target reference pixel corresponds to the current pixel,
      the extension region comprises a plurality of pixels,
      a pixel value of any first pixel in the extension region is determined based on a pixel value of a second pixel in the reference image,
      a connecting line between a location of the second pixel on a surface of a polyhedron formed by the reference image and a location of the first pixel on a first plane passes through a center point of the polyhedron,
      the location of the second pixel on the surface of the polyhedron is determined based on the location of the first pixel and layout information of the polyhedron corresponding to the reference image, and
      the first plane is a plane on which a face, of the polyhedron, corresponding to the second sub-image is located,
    wherein the polyhedron corresponding to the reference image is disposed on the reference image and an anchor face of the polyhedron is a face on which a region of the second sub-image in the reference image is located,
    wherein the anchor face is also a face used as a reference when the polyhedron is unfolded; and
  predicting a pixel value of the current pixel based on a pixel value of the target reference pixel by:
    obtaining a weighted pixel value by performing weighted processing on the pixel value of the target reference pixel and a pixel value of a pixel near the target reference pixel; and
    determining that the weighted pixel value at the location of the target reference pixel is the predicted pixel value of the current pixel.

7. The method according to claim 6, wherein further comprising:
  determining the location of the second pixel on the surface of the polyhedron based on the location of the first pixel and layout information of the reference image, wherein the location of the second pixel on the surface of the polyhedron is at an intersection point of the surface of the polyhedron and a connecting line between the first pixel and the center point of the polyhedron; and
  determining a location of the second pixel in the reference image based on the location of the second pixel on the surface of the polyhedron and the layout information of the reference image.

8. The method according to claim 6, further comprising:
  determining, based on layout information of the reference image and the location of the initial reference pixel, whether the initial reference pixel is located outside the second sub-image in the reference image.

9. A motion compensating prediction method, comprising:
  determining a location of an initial reference pixel in a reference image, the initial reference pixel corresponding to a current pixel located in a first sub-image of a current image, wherein both the reference image and the current image are comprised of one or more sub-images;
  when the location of the initial reference pixel is outside of a second sub-image of the reference image but is corresponding to the first sub-image of the current image,
    determining, based on the location of the initial reference pixel, a location of a target reference pixel on a surface of a polyhedron corresponding to the reference image, wherein
      the target reference pixel corresponds to the current pixel,
      a connecting line between the location of the target reference pixel on the surface of the polyhedron and a location of the initial reference pixel on a first plane passes through a center point of the polyhedron, and
      the first plane is a plane on which a face, of the polyhedron, corresponding to the second sub-image is located,
    wherein the polyhedron corresponding to the reference image is disposed on the reference image and an anchor face of the polyhedron is a face on which a region of the second sub-image in the reference image is located, wherein the anchor face is also a face used as a reference when the polyhedron is unfolded;

determining a location of the target reference pixel in the reference image based on the location of the target reference pixel on the surface of the polyhedron; and predicting a pixel value of the current pixel based on a pixel value of the target reference pixel in the reference image by:

obtaining a weighted pixel value by performing weighted processing on the pixel value of the target reference pixel and a pixel value of a pixel near the target reference pixel; and determining that the weighted pixel value at the location of the target reference pixel is the predicted pixel value of the current pixel.

10. The method according to claim 9, wherein determining, based on the location of the initial reference pixel, the location of the target reference pixel on a surface of a polyhedron corresponding to the reference image comprises:

determining the location of the initial reference pixel on the first plane based on the location of the initial reference pixel and layout information of the reference image; and determining the location of the target reference pixel on the surface of the polyhedron based on the location of the initial reference pixel on the first plane and the layout information of the reference image.

11. The method according to claim 9, wherein determining the location of the target reference pixel in the reference image based on the location of the target reference pixel on the surface of the polyhedron comprises:

determining the location of the target reference pixel in the reference image based on the location of the initial reference pixel and layout information of the reference image, wherein the location of the target reference pixel on the surface of the polyhedron is at an intersection point of the surface of the polyhedron and a connecting line between the initial reference pixel and the center point of the polyhedron.

12. A motion compensating prediction apparatus, comprising a processor and a non-transitory computer readable medium storing program instructions such that executing the program instructions facilitates:

determining a location of an initial reference pixel in a reference image, the initial reference pixel corresponding to a current pixel located in a first sub-image of a current image, wherein both the reference image and the current image are comprised of one or more sub-images;

when the location of the initial reference pixel is outside of a second sub-image of the reference image but is corresponding to the first sub-image of the current image, determining a location of a target reference pixel in the reference image based on the location of the initial reference pixel, wherein the target reference pixel corresponds to the current pixel, a connecting line between a location of the target reference pixel on a surface of a polyhedron corresponding to the reference image and a location of the initial reference pixel on a first plane passes through a center point of the polyhedron, the location of the target reference pixel on the surface of the polyhedron is determined based on the location of the initial reference pixel and layout information of the polyhedron corresponding to the reference image, and the first plane is a plane on which a face, of the polyhedron, corresponding to the second sub-image is located, wherein the polyhedron corresponding to the reference image is disposed on the reference image and an anchor face of the polyhedron is a face on which a region of the second sub-image in the reference image is located, wherein the anchor face is also a face used as a reference when the polyhedron is unfolded; and predicting a pixel value of the current pixel based on a pixel value of the target reference pixel by:

obtaining a weighted pixel value by performing weighted processing on the pixel value of the target reference pixel and a pixel value of a pixel near the target reference pixel; and determining that the weighted pixel value at the location of the target reference pixel is the predicted pixel value of the current pixel.

13. The motion compensating prediction apparatus according to claim 12, wherein executing the program instructions further facilitates:

determining, based on layout information of the reference image and the location of the initial reference pixel, whether the initial reference pixel is located outside the second sub-image of the reference image.

14. The motion compensating prediction apparatus according to claim 12, wherein executing the program instructions further facilitates:

determining the location of the target reference pixel on the surface of the polyhedron based on the location of the initial reference pixel and the layout information of the reference image, wherein the location of the target reference pixel on the surface of the polyhedron is at an intersection point of the surface of the polyhedron and a connecting line between the initial reference pixel and the center point of the polyhedron; and determining the location of the target reference pixel in the reference image based on the location of the target reference pixel on the surface of the polyhedron and the layout information of the reference image.

15. The motion compensating prediction apparatus according to claim 14, wherein executing the program instructions further facilitates:

determining the location of the initial reference pixel on the first plane based on the location of the initial reference pixel and the layout information of the reference image; and determining the location of the target reference pixel on the surface of the polyhedron based on the location of the initial reference pixel on the first plane and the layout information of the reference image.

16. The motion compensating prediction apparatus according to claim 12, wherein the layout information comprises one or more selected from the group consisting of:

face quantity information of the polyhedron, sub-image arrangement manner information of the reference image, sub-image arrangement sequence information of the reference image, and sub-image rotation information of the reference image.

17. A motion compensating prediction apparatus, comprising a processor and a non-transitory computer readable medium storing program instructions such that executing the program instructions facilitates:

determining a location of an initial reference pixel in a reference image, the initial reference pixel corresponding to a current pixel located in a first sub-image of a current image, wherein both the reference image and the current image are comprised of one or more sub-images;

when the location of the initial reference pixel is outside of a second sub-image of the reference image but is corresponding to the first sub-image of the current image, determining a location of a target reference pixel in an extension region of the second sub-image, located outside the second sub-image, wherein the target reference pixel corresponds to the current pixel, the extension region comprises a plurality of pixels, a pixel value of any first pixel in the extension region is determined based on a pixel value of a second pixel in the reference image, a connecting line between a location of the second pixel on a surface of a polyhedron formed by the reference image and a location of the first pixel on a first plane passes through a center point of the polyhedron, the location of the second pixel on the surface of the polyhedron is determined based on the location of the first pixel and layout information of the polyhedron corresponding to the reference image, and the first plane is a plane on which a face, of the polyhedron, corresponding to the second sub-image is located, wherein the polyhedron corresponding to the reference image is disposed on the reference image and an anchor face of the polyhedron is a face on which a region of the second sub-image in the reference image is located, wherein the anchor face is also a face used as a reference when the polyhedron is unfolded; and predicting a pixel value of the current pixel based on a pixel value of the target reference pixel by:

obtaining a weighted pixel value by performing weighted processing on the pixel value of the target reference pixel and a pixel value of a pixel near the target reference pixel; and determining that the weighted pixel value at the location of the target reference pixel is the predicted pixel value of the current pixel.

18. The motion compensating prediction apparatus according to claim 17, wherein executing the program instructions further facilitates:

determining the location of the second pixel on the surface of the polyhedron based on the location of the first pixel and layout information of the reference image, wherein the location of the second pixel on the surface of the polyhedron is at an intersection point of the surface of the polyhedron and a connecting line between the first pixel and the center point of the polyhedron; and determining a location of the second pixel in the reference image based on the location of the second pixel on the surface of the polyhedron and the layout information of the reference image.

19. The motion compensating prediction apparatus according to claim 17, wherein executing the program instructions further facilitates:

determining, based on layout information of the reference image and the location of the initial reference pixel, whether the initial reference pixel is located outside the second sub-image in the reference image.

20. A motion compensating prediction apparatus, comprising a processor and a non-transitory computer readable medium storing program instructions such that when executing the program instructions facilitates:

determining a location of an initial reference pixel in a reference image, the initial reference pixel corresponding to a current pixel located in a first sub-image of a current image, wherein both the reference image and the current image are comprised of one or more sub-images;

when the location of the initial reference pixel is outside of a second sub-image of the reference image but is corresponding to the first sub-image of the current image, determining, based on the location of the initial reference pixel, a location of a target reference pixel of the current pixel on a surface of a polyhedron corresponding to the reference image, wherein the target reference pixel corresponds to the current pixel, a connecting line between the location of the target reference pixel on the surface of the polyhedron and a location of the initial reference pixel on a first plane passes through a center point of the polyhedron, and the first plane is a plane on which a face, of the polyhedron, corresponding to the second sub-image is located, wherein the polyhedron corresponding to the reference image is disposed on the reference image and an anchor face of the polyhedron is a face on which a region of the second sub-image in the reference image is located, wherein the anchor face is also a face used as a reference when the polyhedron is unfolded;

determining a location of the target reference pixel in the reference image based on the location of the target reference pixel on the surface of the polyhedron; and predicting a pixel value of the current pixel based on a pixel value of the target reference pixel in the reference image by:

obtaining a weighted pixel value by performing weighted processing on the pixel value of the target reference pixel and a pixel value of a pixel near the target reference pixel; and determining that the weighted pixel value at the location of the target reference pixel is the predicted pixel value of the current pixel.

21. The motion compensating prediction apparatus according to claim 20, wherein executing the program instructions further facilitates:

determining the location of the initial reference pixel on the first plane based on the location of the initial reference pixel and layout information of the reference image; and determining the location of the target reference pixel on the surface of the polyhedron based on the location of the initial reference pixel on the first plane and the layout information of the reference image.

22. The motion compensating prediction apparatus according to claim 20, wherein executing the program instructions further facilitates:

determining the location of the target reference pixel in the reference image based on the location of the initial reference pixel and layout information of the reference image, wherein the location of the target reference pixel on the surface of the polyhedron is at an intersection point of the surface of the polyhedron and a connecting line between the initial reference pixel and the center point of the polyhedron.

* * * * *